United States Patent
Thomas et al.

(10) Patent No.: US 7,197,244 B2
(45) Date of Patent: Mar. 27, 2007

(54) METHOD AND SYSTEM FOR PROCESSING DOWNSTREAM PACKETS OF AN OPTICAL NETWORK

(75) Inventors: Stephen A. Thomas, Marietta, GA (US); Kevin Bourg, Alpharetta, GA (US); Joe Caltagirone, Alpharetta, GA (US); Patrick W. Quinn, Lafayette, CA (US); James O. Farmer, Lilburn, GA (US); John J. Kenny, Norcross, GA (US); Thomas A. Tighe, Alpharetta, GA (US); Paul F. Whittlesey, Sugar Hill, GA (US); Emmanuel A. Vella, Alpharetta, GA (US)

(73) Assignee: Wave7 Optics, Inc., Alpharetta, GA (US)

( * ) Notice: Subject to any disclaimer, the term of this patent is extended or adjusted under 35 U.S.C. 154(b) by 620 days.

(21) Appl. No.: 10/045,652

(22) Filed: Oct. 26, 2001

(65) Prior Publication Data

US 2003/0086140 A1 May 8, 2003

Related U.S. Application Data

(63) Continuation-in-part of application No. 09/899,410, filed on Jul. 5, 2001.

(60) Provisional application No. 60/289,112, filed on May 8, 2001, provisional application No. 60/258,837, filed on Dec. 28, 2000, provisional application No. 60/243,978, filed on Oct. 27, 2000, provisional application No. 60/244,052, filed on Oct. 26, 2000.

(51) Int. Cl.
*H04B 10/00* (2006.01)

(52) U.S. Cl. ......................... 398/72; 398/70

(58) Field of Classification Search .............. 398/58, 398/66–73, 140–141; 370/463, 468
See application file for complete search history.

(56) References Cited

U.S. PATENT DOCUMENTS 4,500,990 A 2/1985 Akashi (Continued)

FOREIGN PATENT DOCUMENTS

EP 0713347 A2 5/1996

(Continued)

OTHER PUBLICATIONS

Miki, Tetsuya et al., "A Design Concept on Fiber-Optic Wavelength-Division-Multiplexing Subscriber Loop System" WTG—Fachber, 1980, pp. 41-45.

(Continued)

*Primary Examiner*—Agustin Bello
(74) *Attorney, Agent, or Firm*—King & Spalding LLP; Steven P. Wigmore

(57) ABSTRACT

Unlike the conventional art which polices data at the entry points of a network, a transceiver node can police or monitor downstream bandwidths for quality of service at exit portions of an optical network. That is, the transceiver node can police downstream communication traffic near the outer edges of an optical network that are physically close to the subscribers of the optical network. In this way, a network provider can control the volume or content (or both) of downstream communications that are received by subscribers of the optical network. In addition to controlling the volume of communications that can be received by a subscriber, the transceiver node employs a plurality of priority assignment values for communication traffic. Some priority assignment values are part of a weighted random early discard algorithm that enables an output buffer to determine whether to drop data packets that are destined for a particular subscriber. In one exemplary embodiment, a weighted random early discard (WRED) priority value can be assigned according to the type of communication traffic supported by a packet.

33 Claims, 9 Drawing Sheets

U.S. PATENT DOCUMENTS

| | | | |
|---|---|---|---|
| 4,665,517 | A | 5/1987 | Widmer |
| 4,763,317 | A | 8/1988 | Lehman et al. |
| 4,956,863 | A | 9/1990 | Goss |
| 4,975,899 | A | 12/1990 | Faulkner |
| 5,132,992 | A | 7/1992 | Yurt et al. |
| 5,179,591 | A | 1/1993 | Hardy et al. |
| 5,247,347 | A | 9/1993 | Litteral et al. |
| 5,249,194 | A | 9/1993 | Sakanushi |
| 5,253,250 | A | 10/1993 | Schlafer et al. |
| 5,253,275 | A | 10/1993 | Yurt et al. |
| 5,325,223 | A | 6/1994 | Bears |
| 5,345,504 | A | 9/1994 | West, Jr. |
| 5,349,457 | A | 9/1994 | Bears |
| 5,365,588 | A | 11/1994 | Bianco et al. |
| 5,412,498 | A | 5/1995 | Arstein et al. |
| 5,469,507 | A | 11/1995 | Canetti et al. |
| 5,510,921 | A | 4/1996 | Takai et al. |
| 5,528,582 | A | 6/1996 | Bodeep et al. |
| 5,534,912 | A | 7/1996 | Kostreski |
| 5,541,917 | A | 7/1996 | Farris |
| 5,550,863 | A | 8/1996 | Yurt et al. |
| 5,557,317 | A | 9/1996 | Nishio et al. |
| 5,559,858 | A | 9/1996 | Beveridge |
| 5,572,347 | A | 11/1996 | Burton et al. |
| 5,572,348 | A | 11/1996 | Carlson et al. |
| 5,572,349 | A | 11/1996 | Hale et al. |
| 5,666,487 | A | 9/1997 | Goodman et al. |
| 5,701,186 | A | 12/1997 | Huber |
| 5,706,303 | A | 1/1998 | Lawrence |
| RE35,774 | E | 4/1998 | Moura et al. |
| 5,778,017 | A | 7/1998 | Sato et al. |
| 5,790,523 | A | 8/1998 | Ritchie, Jr. et al. |
| 5,793,413 | A | 8/1998 | Hylton et al. |
| 5,802,089 | A | 9/1998 | Link |
| 5,861,966 | A | 1/1999 | Ortel |
| 5,875,430 | A | 2/1999 | Koether |
| 5,880,864 | A | 3/1999 | Williams et al. |
| 5,892,865 | A | 4/1999 | Williams |
| 5,969,836 | A | 10/1999 | Foltzer |
| 6,002,720 | A | 12/1999 | Yurt et al. |
| 6,041,056 | A | 3/2000 | Bigham et al. |
| 6,097,159 | A | 8/2000 | Mogi et al. |
| 6,097,515 | A | 8/2000 | Pomp et al. |
| 6,144,702 | A | 11/2000 | Yurt et al. |
| 6,151,343 | A | 11/2000 | Jurgensen |
| RE37,125 | E | 4/2001 | Carlson et al. |
| 6,295,148 | B1 | 9/2001 | Atlas |
| 6,336,201 | B1 | 1/2002 | Geile et al. |
| 6,356,369 | B1 | 3/2002 | Farhan |
| 6,360,320 | B1 | 3/2002 | Ishiguro et al. |
| 6,385,366 | B1 | 5/2002 | Lin |
| 6,427,035 | B1 | 7/2002 | Mahony |
| 6,460,182 | B1 | 10/2002 | BuAbbud |
| 6,463,068 | B1* | 10/2002 | Lin et al. ............. 370/414 |
| 6,483,635 | B1 | 11/2002 | Wach |
| 6,546,014 | B1 | 4/2003 | Kramer et al. |
| 6,611,522 | B1* | 8/2003 | Zheng et al. ......... 370/395.21 |
| 6,674,967 | B2 | 1/2004 | Skrobko et al. |
| 6,680,948 | B1* | 1/2004 | Majd et al. ............ 370/401 |
| 6,889,007 | B1* | 5/2005 | Wang et al. ............ 398/79 |
| 2001/0002195 | A1 | 5/2001 | Fellman et al. |
| 2001/0002196 | A1 | 5/2001 | Fellman et al. |
| 2001/0002486 | A1 | 5/2001 | Kocher et al. |
| 2001/0030785 | A1 | 10/2001 | Pangrac et al. |
| 2002/0021465 | A1 | 2/2002 | Moore, Jr. et al. |
| 2002/0027928 | A1* | 3/2002 | Fang ................. 370/468 |
| 2002/0039218 | A1 | 4/2002 | Farmer et al. |
| 2002/0089725 | A1 | 7/2002 | Farmer et al. |
| 2002/0105965 | A1* | 8/2002 | Dravida et al. ......... 370/463 |
| 2002/0135843 | A1 | 9/2002 | Gruia |
| 2002/0164026 | A1 | 11/2002 | Huima |
| 2003/0090320 | A1 | 5/2003 | Skrobko et al. |

FOREIGN PATENT DOCUMENTS

| | | |
|---|---|---|
| EP | 0720322 A2 | 7/1996 |
| EP | 0 566 662 | 11/1999 |
| EP | 0955739 A2 | 11/1999 |
| EP | 0 933 892 | 10/2003 |
| JP | 4-504433 | 8/1992 |
| MX | 180038 | 11/1995 |
| WO | WO 01/27940 A2 | 4/2001 |
| WO | WO 02/030019 A3 | 4/2002 |
| WO | WO 02/30020 A2 | 4/2002 |
| WO | WO 02/060123 A2 | 8/2002 |

OTHER PUBLICATIONS

International Search Report of Jul. 7, 2003 for PCT/US01/51350.

Angelopoulos, J.D. et al., "A Transport Mac Method for Bandwidth Sharing and CDV Control at the ATM Layer of Passive Optical Networks" Journal of Lightwave Technology, IEEE, 1996, pp. 2625-2634.

International Search Report of Jul. 2, 2003 for PCT/US03/07814.

International Search Report of Oct. 3, 2003 for PCT/US03/12231.

Ciciora, Walter S. et al., "Modern Cable Television Technology: Video, Voice, and Data Communica-tions", © 1999, pp. 162-214, Chapter 4, Morgan Kaufmann Publishers, Inc., San Francisco, California.

Glaesemann, G. Scott et al., "The Mechanical Reliability of Corning® Single-Mode Optical Fiber", Apr. 2002, pp. 1-4.

Corning® SMF-28™ Optical Fiber Product Information, "Corning® Single-Mode Optical Fiber", Apr. 2002, pp. 1-4.

Companie Deutsch, Components for Fiber Optics, "Triplexers—WDM: FSAN—TPM Series", pp. 1-6.

CEDaily Direct News, "Today's Report", Mar. 19, 2001, pp. 1-5.

Lucent Technologies, "Lucent Technologies Introduces Single-Fiber Network Access Devices for Voice, Video, and Data Services to the Home or Curb", Jun. 6, 2000, pp. 1-2.

Lucent Technologies, "Agere Systems Introduces Sinlge-Fiber Network Access Devices for Voice, Video and Data Services to the Home or Curb", Mar. 19, 2001, pp. 1-3.

Optical Networks Daily, A Publication of Optical Keyhole, Aug. 26, 2003, pp. 1-13.

International Preliminary Examination Report of Oct. 27, 2003 for PCT/US01/21298.

Bourne, John et al., "Heathrow—Experience and Evolution" IEEE, 1990, pp. 1091-1095.

Yamaguchi, K. et al., "A Broadband Access Network Based on Optical Signal Processing: The Photonic Highway" IEEE, 1990, pp. 1030-1037.

Written Opinion of Jul. 23, 2003 for PCT/US02/028734.

International Search Report dated Apr. 22, 2003 for PCT/US01/50361.

L. Zhang et al., "Label-switching architectures for IP traffic over WDM networks", IEE Proc.-Commun., vol. 147, No. 5, Oct. 2000, pp. 269-275.

J. Masip-Torné, et al., "Providing Differentiated Service Categories in Optical Packet Networks", Proceedings of the International Teletraffic Congress 1999.

ITC-16. Teletraffic Engineering in a Competitive World. Edinburgh, UK, Jun. 7-11, 1999, Teletraffic Science and Engineering, Amsterdam: Elsevier, NL, vol. 3B, Jun. 7, 1999, pp. 1115-1126.

J. Bannister et al., "How Many Wavelengths Do We Really Need? A Study of the Performance Limits of Packet Over Wavelengths", Optical Networks Magazin, SPIE, Bellingham, WA, vol. 1, No. 2, Apr. 2000, pp. 17-28.

O. W. W. Yang, et al. , "All-Optical WDM/TDM Star-Bus Network Using Optical Amplifiers", Journal of Optical Communications, Fachverlage Schiele & Schon, Berlin, OH, vol. 16, No. 6, Dec. 1, 1995, pp. 216-226.

Walter Ciciora et al, "Modern Cable Television Technology: Video, Voice, and Data Communications", © 1999 by Morgan Kaufman Publishers, Ioc., pp. 167-176.

International Search Report dated Apr. 21, 2003 for PCT/US02/28734.

Written Opinion dated May 6, 2003 for PCT/US01/21298.

"Trading Update and Operational Review Presentation" Marconi, Sep. 4, 2001, pp. 1-35.

"Cable Market" 2 pgs. Marconi Corporation, PLC, 2000 at www.Marconi.com.

"Communications" 2 pgs, Marconi Corporation, PLC, 2000, at www.Marconi.com.

"Dalton Utilities" 9 pgs, Marconi Corporation, PLC, 2002 at www.Marconi.com.

"Deep Fiber Solutions" 3 pgs, Marconi Corporation, PLC, 2000 at www.Marconi.com.

"Deep Fiber HFC Features and Benefits" 1 pg, Marconi Corporation, PLC, 2002 at www.Marconi.com.

"Deeb Fiber HFC Network Diagram" 1 pg, Marconi Corporation, PLC, 2002 at www.Marconi.com.

"Deep Fiber HFC Product Overview: New FITL Configuration" 2 pgs, Marconi Corporation, PLC, 2002 at www.Marconi.com.

"Deep Fiber HFC Technical Specifications" 2 pgs, Marconi Corporation, PLC, 2002 at www.Marconi.com.

"Deep Fiber HFC—New FITL Configuration" 1 pg, Marconi Corporation, PLC, 2002 at www.Marconi.com.

"En-Touch" at 5 pgs, Marconi Corporation, PLC, 2002 www.Marconi.com.

"Fiber to the Home" International Engineering Consortium(no date) pp. 1-10, available at www.iec.com.

"Deep Fiber HFC" Marconi Corporation PLC 2000, pp. 1-2.

"Integrated Voice, Video and Data Services Over a Single Fiber: A Compelling Opportunity for Cable Operators" Marconi Corporation PLC, May 2000, 6 pgs.

"Deep Fiber Solutions: Advanced Broadband Services" Marconi Corporation PLC, May 2000, 5 pgs.

"Deep Fiber HFC: A Next-Generation Integrated Access Solution Offering Significant Improvement Over Traditional HFC Architectures" Marconi Corporation PLC, May 2000, 8pgs.

"A Gold Mine of Opportunities in the Face of Increasing Competition: Choices for Utilities Entering the Communications Marketplace" Marconi Corporation PLC, May 2000, 6 pgs.

"Fiber Optics on New Development MDUs: A Research Summary," Marconi Corporation PLC, May 2000, 5 pgs.

"Thermal Management Challenges: Small ONU Enclosures," Marconi Corporation PLC, May 2000, 9pgs.

"Passive Optical Networks—Is There Light at the End of the Access Tunnel?" CIBC World Markets Inc., Jan. 11, 2001, pp. 1-66.

"36.2.4 8B/10B transmission code", IEEE 2000, pp. 966-969.

G. Khoe et al., "Coherent Multicarrier Technology for Implementation in the Customer Access," IEEE, May/Jun. 1993, pp. 695-713.

L. Linnell, "A Wide-Band Local Access System Using Emerging-Technology Components," IEEE, Jul. 1986, pp. 612-618.

"Digital Broadband Delivery System: Out of Band Transport—Mode B," Society of Cable Telecommunications Engineers, Inc., Aug. 10, 1998, 76 pgs.

"Digital Broadband Delivery System: Out of Band Transport—Mode A," Society of Cable Telecommunications Engineers, Inc., Aug. 26, 1998, 49 pgs.

B. Gaglianello & P. Thompson, "An Efficient MAC Layer Protocol for EPON," IEEE 802.3 EFM Nov. 2001, 9 pgs.

"Policing and Shaping Overview" *Quality of Service Solutions Configuration Guide*, Cisco Systems, Inc. (No Date).

"Cisco IOS™ Software Quality of Service Solutions," Cisco Systems, Inc. 1998, 28 pgs.

International Search Report for PCT/US01/21298, 2 pgs , mailed Jun. 17, 2002.

International Search Report for PCT/US02/03056, 1 pg, mailed Jun. 12, 2002.

"Ethernet—Accelerating the Standard for Speed," 7 pgs, Gigabit Ethernet Alliance, Nov. 2000 at www.gigabit-ethernet.org.

"eLuminant—Asynchronous Transfer Mode (ATM) Passive Optical Networks (PONS) Tutorial" 28 pgs, the International Engineery Consortium, 2000 at www.iec.org.

International Search Report dated Dec. 4, 2002 for PCT/US02/27398.

International Search Report dated Dec. 17, 2002 for PCT/US02/15861.

Global Access™, Universal Services Gateway, USG100, ARRIS, pp. 1-2, Oct. 18, 2002.

Global Access™, Universal Access Switch, UA4024, ARRIS, pp 12, Aug. 28, 2002.

McDevitt et al., Switched vs. Broadcast Video for Fiber-to-the-Home Systems, Alcatel Network Systems, 1990, IEEE, CH2829-09/90/0000-1109, pp. 1109-1119.

Mangum et al., Fiber to the Home Experience in Southern Bell, BellSouth Services and Northern Telecom, 1988, IEEE, CH2536-1/88/0000-0208, pp. 208-212.

Han et al. Burst-Mode Penalty of AC- Coupled Optical Receivers Optimized for 8B/10B Line Code, 2004, IEEE.

Coppinger et al., Nonlinear Raman Cross-Talk in a Video Overlay Passive Optical Network, 2003, Tuesday Afternoon, OFC 2003, vol. 1, pp. 285-286.

Piehler et al., Nonlinear Raman Crosstalk in a 125-Mb/s CWDM Overlay on a 1310-nm Video Access Network, 2003, Optical Society of America.

Wong et al., 50-dB Nonlinear Crosstalk Suppression in a WDM Analog Fiber System by Complementary Modulation and Balanced Detection, 2003, IEEE, pp. 500-505.

Perkins, The Art of Overlaying Video Services on a BPON, 2004, Bechtel Corporation, pp. 1-9.

\* cited by examiner

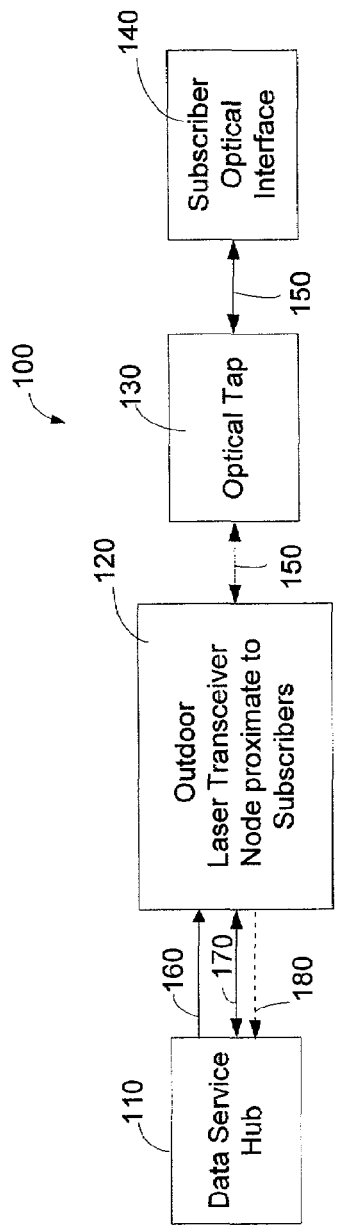
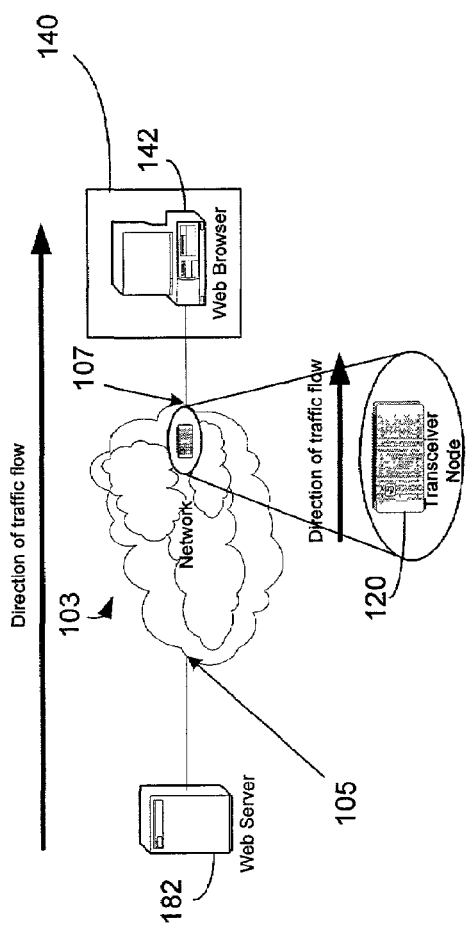

Transceiver Node
120

METHOD AND SYSTEM FOR PROCESSING DOWNSTREAM PACKETS OF AN OPTICAL NETWORK

STATEMENT REGARDING RELATED APPLICATIONS

This application is a continuation-in-part of a non-provisional patent application entitled, "System and Method for Communicating Optical Signals between a Data Service Provider and Subscribers," filed on Jul. 5, 2001 and assigned U.S. application Ser. No. 09/899,410. The present application is also related to non-provisional application entitled, "System and Method for Communicating Optical Signals Upstream and Downstream between a Data Service Provider and Subscribers," filed on Oct. 4, 2001 and assigned U.S. Ser. No. 09/971,363. The present application claims priority to provisional patent application entitled, "Systems to Provide Video, Voice and Data services via Fiber Optic Cable—Part 2," filed on Oct. 26, 2000 and assigned U.S. Application Ser. No. 60/244,052; provisional patent application entitled, "Systems to Provide Video, Voice and Data services via Fiber Optic Cable—Part 3," filed on Dec. 28, 2000 and assigned U.S. Application Ser. No. 60/258,837; provisional patent application entitled, "Protocol to Provide Voice and Data Services via Fiber Optic Cable," filed on Oct. 27, 2000 and assigned U.S. Application Ser. No. 60/243,978; and provisional patent application entitled, "Protocol to Provide Voice and Data Services via Fiber Optic Cable—Part 2," filed on May 8, 2001 and assigned U.S. Application Ser. No. 60/289,112, the entire contents of each of these applications are also incorporated by reference.

TECHNICAL FIELD

The present invention relates to video, voice, and data communication. More particularly, the present invention relates to a system and method for communicating downstream optical signals from a data service provider to one or more subscribers.

BACKGROUND OF INVENTION

The increasing reliance on communication networks to transmit more complex data, such as voice and video traffic, is causing a very high demand for bandwidth. To resolve this demand for bandwidth, communication networks are relying more upon optical fibers to transmit this complex data. Conventional communication architectures that employ coaxial cables are slowly being replaced with communication networks that comprise only fiber optic cables. One advantage that optical fibers have over coaxial cables is that a much greater amount of information can be carried on an optical fiber.

The Fiber-to-the-home (FTTH) optical network architecture has been a dream of many data service providers because of the aforementioned capacity of optical fibers that enable the delivery of any mix of high-speed services to businesses and consumers over highly reliable networks. Related to FTTH is fiber to the business (FTTB). FTTH and FTTB architectures are desirable because of improved signal quality, lower maintenance, and longer life of the hardware involved with such systems. However, in the past, the cost of FTTH and FTTB architectures have been considered prohibitive. But now, because of the high demand for bandwidth and the current research and development of improved optical networks, FTTH and FTTB have become a reality.

A conventional hybrid fiber-to-the-home (FTTH)/hybrid fiber-coax (HFC) architecture has been proposed by the industry. HFC is currently the architecture of choice for many cable television systems. In this FTTH/HFC architecture, an active signal source is placed between the data service hub and the subscriber. Typically, in this architecture, the active source comprises a router. This conventional router typically has multiple data ports that are designed to support individual subscribers. More specifically, the conventional router uses a single port for each respective subscriber. Connected to each data port of the router is an optical fiber which, in turn, is connected to the subscriber. The connectivity between data ports and optical fibers with this conventional FTTH/HFC architecture yield a very fiber intensive last mile. It noted that the terms, "last mile" and "first mile", are both generic terms used to describe the last portion of an optical network that connects to subscribers.

In addition to a high number of optical cables originating from the router, the FTTH/HFC architecture requires radio frequency signals to be propagated along traditional coaxial cables. Because of the use of coaxial cables, numerous radio frequency (RF) amplifiers are needed between the subscriber and the data service help. For example, RF amplifiers are typically needed every one to three kilometers in a coaxial type system.

The use of coaxial cables and the FTTH/HFC architecture adds to the overall cost of the system because two separate and distinct networks are present in such an architecture. In other words, the FTTH/HFC architecture has high maintenance cost because of the completely different wave guides (coaxial cable in combination with optical fiber) in addition to the electrical and optical equipment needed to support such two distinct systems. More simply, the FTTH/HFC architecture merely combines an optical network with an electrical network with both networks running independently of one another.

One problem with the electrical network in the FTTH/HFC architecture involves cable modem technology which supports the data communications between the data service provider and the subscriber. The data service subscriber typically employs a cable modem termination system (CMTS) to originate downstream data communications that are destined to the subscriber. To receive these downstream data communications, the subscriber will typically use a cable modem that operates according to a particular protocol known in the industry as Data-Over-Cable-Service-Interface-Specification (DOCSIS). The DOCSIS protocol defines service flows, which are identifications assigned to groups of packets by the CMTS for the downstream flows based on an inspection of a number of parameters in a packet.

More specifically, a service flow is a media access control (MAC)-layer transport service that provides unique directional transport of packets either to upstream packets transmitted by the cable modem or to downstream packets transmitted by the CMTS. The identifications assigned to groups of packets in the DOCSIS protocol can include parameters such as TCP, UTP, IP, LLC, and 802.1 P/Q identifiers contained in an incoming packet.

Based on these identifications, the CMTS assigns a service flow ID (SFID) to a particular datastream. A service flow typically exists when the CMTS assigns this SFID to a datastream. The SFID serves as the principle identifier in the CMTS for the service flow. A service flow is characterized by at least an SFID and an associated direction. One of the main drawbacks of the DOCSIS protocol for downstream data communications is that this protocol does not offer any guaranteed bandwidth. In other words, every cable modem in a particular subscriber group competes for bandwidth in both the upstream and downstream directions when a particular modem needs it. This competition between modems for bandwidths can significantly affect the quality of service of data communications for each individual cable modem receiving downstream data communications.

For example, subscribers that desire to use their cable modem for T1 communications require a constant bit rate and consistent arrival time of packets in order to reduce any jitter in the communications. T1 communications can include telephone calls, video conferencing, and other similar traffic. Because each cable modem according to the DOCSIS protocol competes for bandwidth, it is possible that some cable modems will not be provided with a constant bit rate for their T1 communications. In such a scenario, the quality of T1 communications can suffer. That is, during a telephone call or a video conference the subscriber may notice either delays in communications or truncation in conversations with the other party to the telephone call or video conference.

DOCSIS is designed to operate over an RF modulated network, which imposes certain restrictions on the protocol. Return bandwidth is low relative to downstream bandwidth, as a result of the way spectrum is apportioned in the two directions. This causes problems with certain applications requiring more symmetrical bandwidth. These applications include peer-to-peer file transfer, video conferencing and communications from web servers.

Accordingly, there is a need in the art for a system and method for communicating optical signals between a data service provider and a subscriber that eliminates the use of coaxial cables and related hardware and software necessary to support the data signals propagating along the coaxial cables. There is also a need in the art for a system and method for communicating optical signals between a data service provider and a subscriber that can service a large number of subscribers while reducing the number of connections at the data service hub.

There is also a need in the art for a method and system for handling downstream optical communications that can police or monitor downstream bandwidths for quality of service at exit portions of the optical network. There is a further need in the art for a system and method that can allocate additional or reduce downstream bandwidths based upon one of demand or the type of service selected by one or more subscribers of an optical network. There is also a need in the art for a method and system for controlling the volume or content (or both) of downstream optical communications that are received by subscribers of an entirely optical network.

SUMMARY OF THE INVENTION

The present invention is generally drawn to a system and method for efficient propagation of data and broadcast signals over an optical fiber network. More specifically, the present invention is generally drawn to a method and system for handling downstream optical communications originating from a data service hub of an optical network that are transmitted to subscribers of the optical network. The term "downstream" can define a communication direction where a data service hub originates data signals that are sent downwards towards subscribers of an optical network. Conversely, the term "upstream" can define a communication direction where a subscriber originates data signals that are sent upwards towards a data service hub of an optical network.

Unlike the conventional art which polices data at the entry points of a network, the present invention can police or monitor downstream bandwidths for quality of service at exit portions of an optical network. That is, the present invention can police downstream communication traffic near the outer edges of an optical network that are physically close to the subscribers of the optical network. In this way, the network provider can control the volume or content (or both) of downstream communications that are received by subscribers of the optical network.

To control volume or content (or both) of downstream communications, the present invention employs multiple levels of evaluation for downstream communication traffic. The multiple levels of evaluation can comprise classifying downstream packets and then evaluating whether the downstream packets match certain size and rate parameters. Specifically, a plurality of classifiers can categorize or classify downstream packets, where each classifier is typically associated with a particular policer. Each policer can also be associated with a particular output buffer that has a priority relative to other output buffers.

Each policer can receive a downstream packet from one or more classifiers. The policer can evaluate the size and rate parameters of a particular downstream packet. For example, a policer can compare a downstream packet to a peak rate, a sustained rate, and a burst size that are assigned to the policer by a network administrator. The network administrator can configure the peak rate, sustained rate, and burst size monitored by each policer to track different types of downstream packets.

If a downstream packet exceeds the peak rate assigned to a policer, then the policer can discard the downstream packet. If the downstream packet exceeds the assigned sustained rate or burst size assigned to a policer, then the policer can identify this traffic as a certain type of traffic, such as "non-conforming traffic." On the other hand, if the downstream packet matches or falls within an sustained rate or burst size of a policer, then the policer can identify this traffic as a certain type of traffic, such as "conforming traffic." The policer can then assign weighted random early discard values (such as a maximum drop probability, maximum threshold, and a minimum threshold) that are unique and separate between conforming downstream traffic and non-conforming downstream traffic. Each policer can operate as a two-stage token bucket algorithm where the first stage bucket enforces the peak rates for the downstream communication traffic. The second stage of each token bucket can identify packets that exceed the burst size or the sustained rate assigned to a particular policer.

One output buffer of several output buffers can receive a packet from respective policer. Each output buffer can separately implement a weighted random early discard (WRED) algorithm to determine if packets should be admitted to a respective buffer or dropped. Each output buffer can use the weighted random early discard value assigned to the downstream packet in the weighted random early discard algorithm.

With the WRED algorithm and classifying traffic by type, certain communication traffic can be given a higher priority over other types of traffic. For example, subscribers that use the optical network for T1 communications require a constant bit rate and consistent arrival time of packets in order to reduce any jitter. T1 communications can include telephone calls, video conferencing, and other similar traffic. To help reduce the possibility of any jitter with the T1 communications, the present invention can assign such T1 communications a higher priority relative to other types of communication traffic that do not require constant bit rates. Other communications that do not require constant bit rates and that can be assigned a lower priority can include Internet surfing, transferring files between computers, and other similar communications.

The present invention can be implemented in hardware such as application specific integrated circuits (ASICs) or field programmable gate arrays (FPGAs) or a combination thereof. However, the present invention is not limited to hardware and can comprise software.

The present invention can comprise a transceiver node that further comprises an optical tap routing device and one or more optical tap multiplexers. The optical tap routing device can determine which optical tap multiplexer is to receive a downstream electrical signal, or identify which of the plurality of optical taps originated an upstream optical signal. The optical tap routing device can format data and implement the protocol required to send and receive data from each individual subscriber connected to a respective optical tap. The optical tap routing device can further comprise an eight-port switch.

The eight-port switch can feed into one or more optical tap multiplexers. Each optical tap multiplexer can comprise one or more packet classifiers, one or more policers, and one or more output buffers.

BRIEF DESCRIPTION OF THE DRAWINGS

FIG. 1A is a functional block diagram of the some core components of an exemplary optical network architecture according to the present invention.

FIG. 1B is a functional block diagram illustrating exemplary functionality and a location of this exemplary functionality in a network according to the present invention.

DETAILED DESCRIPTION OF EXEMPLARY EMBODIMENTS

Figure 2:
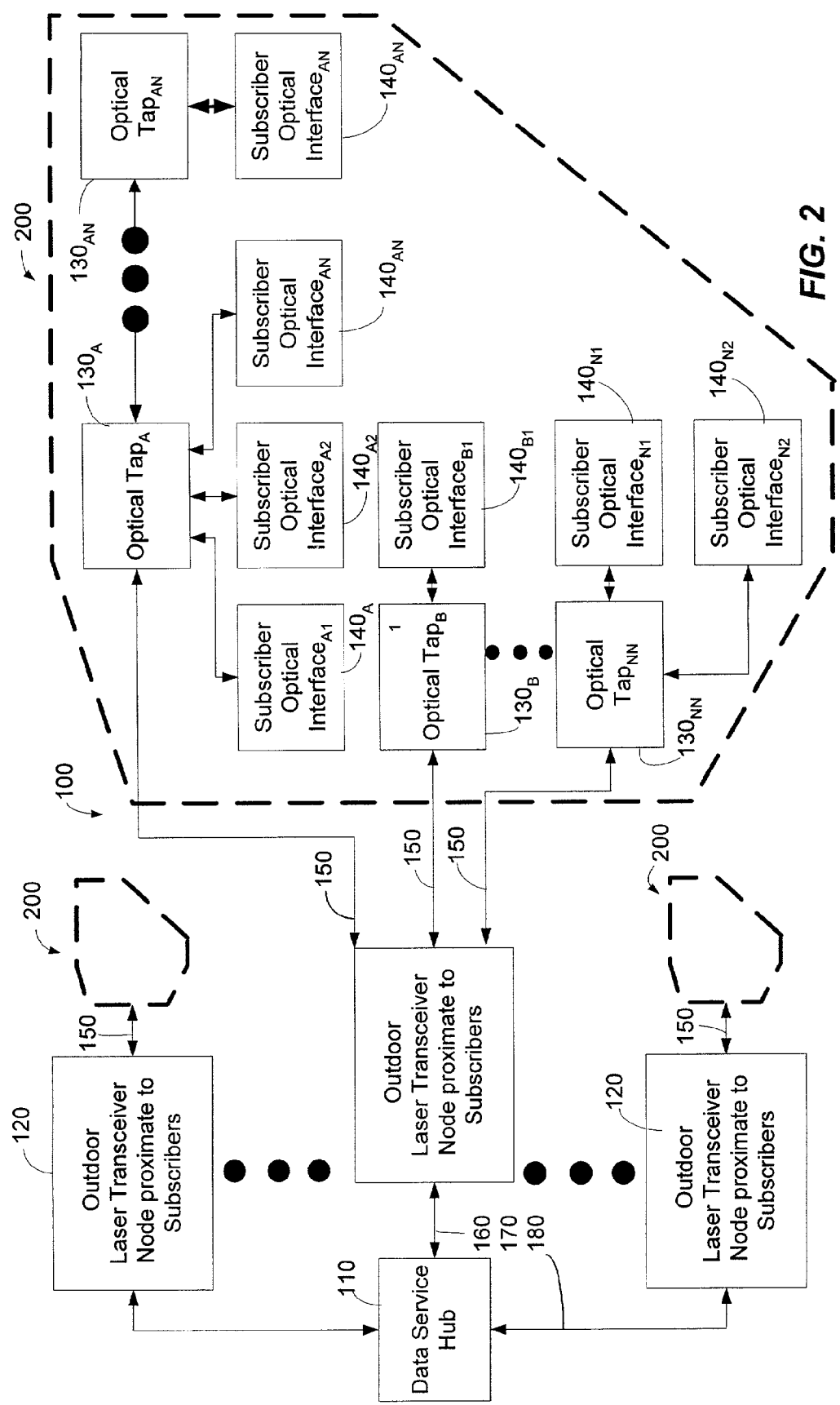
FIG. 2 is a functional block diagram illustrating an exemplary optical network architecture for the present invention.

The present invention may be embodied in hardware or software or a combination therewith disposed within an optical network. The present invention can comprise a transceiver node that further comprises an optical tap routing device and a plurality of optical tap multiplexers for receiving downstream packets from the optical tap routing device. Each optical tap multiplexer may comprise a plurality of classifiers and a plurality of policers. With the classifiers and policers, the present invention can support at least one gigabit or faster data rate, and Ethernet communications in optical form to and from the data service hub and partition or apportion this optical bandwidth into distribution groups of a predetermined number. The present invention can allow optical bandwidth to be offered to subscribers in preassigned increments. The flexibility and diversity of the present invention can be attributed to a few components.

Referring now to the drawings in which like numerals represent like elements throughout the several figures, aspects of the present invention and the illustrative operating environment will be described.

FIG. 1A is a functional block diagram illustrating an exemplary optical network architecture 100 according to the present invention. The exemplary optical network architecture 100 comprises a data service hub 110 that is connected to one or more outdoor transceiver nodes 120. The transceiver nodes 120, in turn, are connected to an optical taps 130. The optical taps 130 can be connected to a plurality of subscriber optical interfaces 140. Between respective components of the exemplary optical network architecture 100 are optical waveguides such as optical waveguides 150, 160, 170, and 180. The optical waveguides 150–180 are illustrated by arrows where the arrowheads of the arrows illustrate exemplary directions of data flow between respective components of the illustrative and exemplary optical network architecture 100. While only an individual transceiver node 120, an individual optical tap 130, and an individual subscriber optical interface 140 are illustrated in FIG. 1A, as will become apparent from FIG. 2 and its corresponding description, a plurality of transceiver nodes 120, optical taps 130, and subscriber optical interfaces 140 can be employed without departing from the scope and spirit of the present invention. Typically, in many of the exemplary embodiments of the present invention, multiple subscriber optical interfaces 140 are connected to one or more optical taps 130.

The outdoor transceiver node 120 can allocate additional or reduced bandwidth based upon the demand of one or more subscribers that use the subscriber optical interfaces 140. The outdoor transceiver node 120 can be designed to withstand outdoor environmental conditions and can be designed to hang on a strand or fit in a pedestal or "hand hole." The outdoor transceiver node can operate in a temperature range between minus 40 degrees Celsius to plus 60 degrees Celsius. The transceiver node 120 can operate in this temperature range by using passive cooling devices that do not consume power.

Unlike the conventional routers disposed between the subscriber optical interface 140 and data service hub 110, the outdoor transceiver node 120 does not require active cooling and heating devices that control the temperature surrounding the transceiver node 120. The present invention attempts to place more of the decision-making electronics at the data service hub 110 instead of the transceiver node 120. Typically, the decision-making electronics are larger in size and produce more heat than the electronics placed in the transceiver node of the present invention. Because the transceiver node 120 does not require active temperature controlling devices, the transceiver node 120 lends itself to a compact electronic packaging volume that is typically smaller than the environmental enclosures of conventional routers.

In one exemplary embodiment of the present invention, three trunk optical waveguides 160, 170, and 180 (that can comprise optical fibers) can conduct optical signals from the data service hub 110 to the outdoor transceiver node 120. It is noted that the term "optical waveguide" used in the present application can apply to optical fibers, planar light guide circuits, and fiber optic pigtails and other like optical waveguides.

A first optical waveguide 160 can carry broadcast video and other signals. The signals can be carried in a traditional cable television format wherein the broadcast signals are modulated onto carriers, which in turn, modulate an optical transmitter (not shown) in the data service hub 110. A second optical waveguide 170 can carry downstream targeted services such as data and telephone services to be delivered to one or more subscriber optical interfaces 140. In addition to carrying subscriber-specific optical signals, the second optical waveguide 170 can also propagate internet protocol broadcast packets, as is understood by those skilled in the art.

In one exemplary embodiment, a third optical waveguide 180 can transport data signals upstream from the outdoor transceiver node 120 to the data service hub 110. The optical signals propagated along the third optical waveguide 180 can also comprise data and telephone services received from one or more subscribers. Similar to the second optical waveguide 170, the third optical waveguide 180 can also carry IP broadcast packets, as is understood by those skilled in the art.

The third or upstream optical waveguide 180 is illustrated with dashed lines to indicate that it is merely an option or part of one exemplary embodiment according to the present invention. In other words, the third optical waveguide 180 can be removed. In another exemplary embodiment, the second optical waveguide 170 propagates optical signals in both the upstream and downstream directions as is illustrated by the double arrows depicting the second optical waveguide 170. In such an exemplary embodiment where the second optical waveguide 170 propagates bidirectional optical signals, only two optical waveguides 160, 170 would be needed to support the optical signals propagating between the data server's hub 110 in the outdoor transceiver node 120. In another exemplary embodiment (not shown), a single optical waveguide can be the only link between the data service hub 110 and the transceiver node 120. In such a single optical waveguide embodiment, three different wavelengths can be used for the upstream and downstream signals. Alternatively, bidirectional data could be modulated on one wavelength.

In one exemplary embodiment, the optical tap 130 can comprise an 8-way optical splitter. This means that the optical tap 130 comprising an 8-way optical splitter can divide downstream optical signals eight ways to serve eight different subscriber optical interfaces 140. In the upstream direction, the optical tap 130 can combine the optical signals received from the eight subscriber optical interfaces 140.

In another exemplary embodiment, the optical tap 130 can comprise a 4-way splitter to service four subscriber optical interfaces 140. Yet in another exemplary embodiment, the optical tap 130 can further comprise a 4-way splitter that is also a pass-through tap meaning that a portion of the optical signal received at the optical tap 130 can be extracted to serve the 4-way splitter contained therein while the remaining optical energy is propagated further downstream to another optical tap or another subscriber optical interface 140. The present invention is not limited to 4-way and 8-way optical splitters. Other optical taps having fewer or more than 4-way or 8-way splits are not beyond the scope of the present invention.

Referring now to FIG. 1B, this figure illustrates exemplary functionality and a location of this exemplary functionality in a network 103 according to the present invention. The network 103 can comprise several of the components of the architecture 100 described in FIG. 1A.

As noted above, unlike the conventional art which polices data at the entry points 105 of a network, the present invention can police or monitor downstream bandwidths for quality of service at exit portions 107 of an optical network 103. That is, the present invention can police downstream communication traffic near the outer edges 107 of an optical network 103 that are relatively, physically close to the subscribers (subscriber optical interfaces 140) of the optical network. In this way, the network provider can control the volume or content (or both) of downstream communications that are received by subscribers of the optical network 103.

As illustrated in FIG. 1B, a third party web server 182 may be coupled to an optical network 103 that comprises transceiver nodes 120. With the transceiver nodes 120 of the present invention, the network provider can limit or control the bandwidth capacity granted to a subscriber. In other words, the network provider can control what quality of service is given to a particular subscriber (such as a subscriber optical interface 140 that may be coupled to a computer 142 running a web browser).

Specifically, the transceiver node 120 running the protocol of the present invention enables a network provider to create different tiers of service that can be ordered by the subscriber. For example, the transceiver node can offer a particular subscriber or groups of subscribers downstream bandwidth in units of 1, 2, 5, 10, 20, 50, 100, 200, and 450 Megabits per second (Mb/s) that are governed by the transceiver node 120.

Referring now to FIG. 2, this Figure is a functional block diagram illustrating an exemplary optical network architecture 100 that further includes subscriber groupings 200 that correspond with a respective outdoor transceiver node 120. FIG. 2 illustrates the diversity of the exemplary optical network architecture 100 where a number of optical waveguides 150 connected between the outdoor transceiver node 120 and the optical taps 130 is minimized. FIG. 2 also illustrates the diversity of subscriber groupings 200 that can be achieved with the optical tap 130.

Each optical tap 130 can comprise an optical splitter. The optical tap 130 allows multiple subscriber optical interfaces 140 to be coupled to a single optical waveguide 150 that is connected to the outdoor transceiver node 120. In one exemplary embodiment, six optical fibers 150 are designed to be connected to the outdoor transceiver node 120. Through the use of the optical taps 130, sixteen subscribers can be assigned to each of the six optical fibers 150 that are connected to the outdoor transceiver node 120.

In another exemplary embodiment, twelve optical fibers 150 can be connected to the outdoor transceiver node 120 while eight subscriber optical interfaces 140 are assigned to each of the twelve optical fibers 150. Those skilled in the art will appreciate that the number of subscriber optical interfaces 140 assigned to a particular waveguide 150 that is connected between the outdoor transceiver node 120 and a subscriber optical interface 140 (by way of the optical tap 130) can be varied or changed without departing from the scope and spirit of the present invention. Further, those skilled in the art recognize that the actual number of subscriber optical interfaces 140 assigned to the particular fiber optic cable is dependent upon the amount of power available on a particular optical fiber 150.

As depicted in subscriber grouping 200, many configurations for supplying communication services to subscribers are possible. For example, while optical tap $130_A$ can connect subscriber optical interfaces $140_{A1}$ through subscriber optical interface $140_{AN}$ to the outdoor laser transmitter node 120, optical tap $130_A$ can also connect other optical taps 130 such as optical tap $130_{AN}$ to the transceiver node 120. The combinations of optical taps 130 with other optical taps 130 in addition to combinations of optical taps 130 with subscriber optical interfaces 140 are limitless. With the optical taps 130, concentrations of distribution optical waveguides 150 at the transceiver node 120 can be reduced. Additionally, the total amount of fiber needed to service a subscriber grouping 200 can also be reduced.

With the active transceiver node 120 of the present invention, the distance between the transceiver node 120 and the data service hub 110 can comprise a range between 0 and 80 kilometers. However, the present invention is not limited to this range. Those skilled in the art will appreciate that this range can be expanded by selecting various off-the-shelf components that make up several of the devices of the present system.

Those skilled in the art will appreciate that other configurations of the optical waveguides disposed between the data service hub 110 and outdoor transceiver node 120 are not beyond the scope of the present invention. Because of the bi-directional capability of optical waveguides, variations in the number and directional flow of the optical waveguides disposed between the data service hub 110 and the outdoor transceiver node 120 can be made without departing from the scope and spirit of the present invention.

Those skilled in the art will appreciate that the selection of optical waveguide transceiver 430 (FIG. 3) in the outdoor transceiver node 120, and the corresponding transceiver (not shown) in data service hub 110, may be optimized for the optical path lengths needed between the data service hub 110 and the outdoor transceiver node 120. Further, those skilled in the art will appreciate that the wavelengths discussed are practical but are only illustrative in nature. In some scenarios, it may be possible to use communication windows at 1310 and 1550 nm in different ways without departing from the scope and spirit of the present invention. Further, the present invention is not limited to a 1310 and 1550 nm wavelength regions. Those skilled in the art will appreciate that smaller or larger wavelengths for the optical signals are not beyond the scope and spirit of the present invention.

Figure 3:
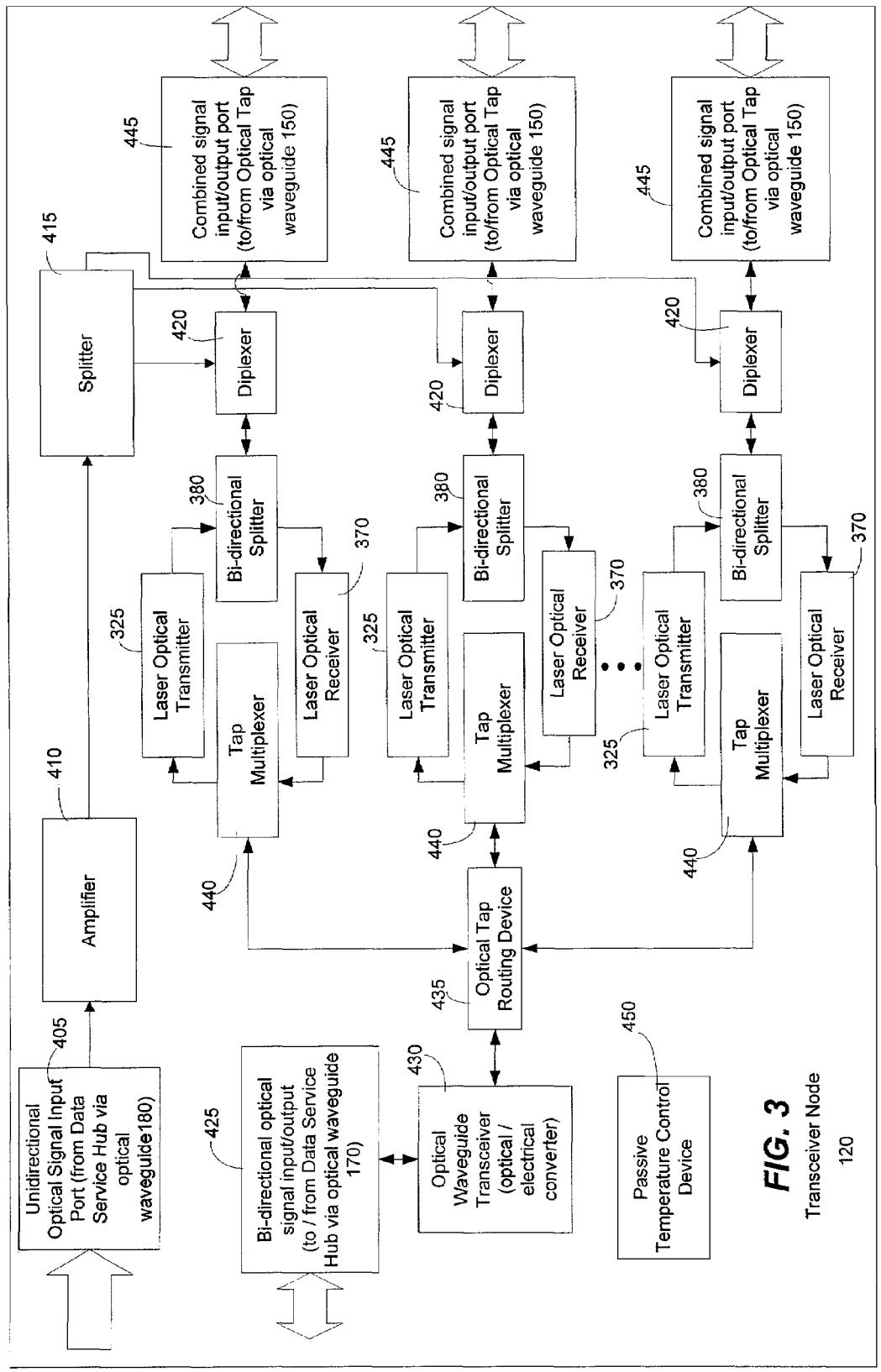
FIG. 3 is a functional block diagram illustrating an exemplary outdoor transceiver node according to the present invention.

Referring now to FIG. 3, this Figure illustrates a functional block diagram of an exemplary outdoor transceiver node 120 of the present invention. In this exemplary embodiment, the transceiver node 120 can comprise a unidirectional optical signal input port 405 that can receive optical signals propagated from the data service hub 110 that are propagated along a first optical waveguide 160. The optical signals received at the unidirectional optical signal input port 405 can comprise broadcast video data. The optical signals received at the input port 405 are propagated to an amplifier 410 such as an Erbium Doped Fiber Amplifier (EDFA) in which the optical signals are amplified. The amplified optical signals are then propagated to a splitter 415 that divides the broadcast video optical signals among diplexers 420 that are designed to forward optical signals to predetermined subscriber groups 200.

The transceiver node 120 can further comprise a bi-directional optical signal input/output port 425 that connects the transceiver node 120 to a second optical waveguide 170 that supports bi-directional data flow between the data service hub 110 and transceiver node 120. Downstream optical signals flow through the bi-directional optical signal input/output port 425 to an optical waveguide transceiver 430 that converts downstream optical signals into the electrical domain. The optical waveguide transceiver further converts upstream electrical signals into the optical domain. The optical waveguide transceiver 430 can comprise an optical/electrical converter and an electrical/optical converter.

Downstream and upstream electrical signals are communicated between the optical waveguide transceiver 430 and an optical tap routing device 435. The optical tap routing device 435 can manage the interface with the data service hub optical signals and can route or divide or apportion the data service hub signals according to individual tap multiplexers 440 that communicate optical signals with one or more optical taps 130 and ultimately one or more subscriber optical interfaces 140. It is noted that tap multiplexers 440 operate in the electrical domain to modulate laser transmitters in order to generate optical signals that are assigned to groups of subscribers coupled to one or more optical taps.

Optical tap routing device 435 is notified of available upstream data packets as they arrive, by each tap multiplexer 440. The optical tap routing device is connected to each tap multiplexer 440 to receive these upstream data packets. The optical tap routing device 435 relays the packets to the data service hub 110 via the optical waveguide transceiver 430. The optical tap routing device 435 can build a lookup table from these upstream data packets coming to it from all tap multiplexers 440 (or ports), by reading the source IP address of each packet, and associating it with the tap multiplexer 440 through which it came. This lookup table can then be used to route packets in the downstream path. As each packet comes in from the optical waveguide transceiver 430, the optical tap routing device 435 looks at the destination IP address (which is the same as the source IP address for the upstream packets). From the lookup table the optical tap routing device 435 can determine which port is connected to that IP address, so it sends the packet to that port. This can be described as a normal layer 3 router function as is understood by those skilled in the art.

The optical tap routing device 435 can assign multiple subscribers to a single port. More specifically, the optical tap routing device 435 can service groups of subscribers with corresponding respective, single ports. The optical taps 130 coupled to respective tap multiplexers 440 can supply downstream optical signals to pre-assigned groups of subscribers who receive the downstream optical signals with the subscriber optical interfaces 140.

In other words, the optical tap routing device 435 can determine which tap multiplexer 440 is to receive a downstream electrical signal, or identify which of a plurality of optical taps 130 propagated an upstream optical signal (that is converted to an electrical signal). The optical tap routing device 435 can format data and implement the protocol required to send and receive data from each individual subscriber connected to a respective optical tap 130. The optical tap routing device 435 can comprise a computer or a hardwired apparatus that executes a program defining a protocol for communications with groups of subscribers assigned to individual ports.

The single ports of the optical tap routing device are connected to respective tap multiplexers 440. With the optical tap routing device 435, the transceiver node 120 can adjust a subscriber's bandwidth on a subscription basis or on an as-needed or demand basis. The transceiver node 120 via the optical tap routing device 435 can offer data bandwidth to subscribers in pre-assigned increments. For example, the transceiver node 120 via the optical tap routing device 435 can offer a particular subscriber or groups of subscribers bandwidth in units of 1, 2, 5, 10, 20, 50, 100, 200, and 450 Megabits per second (Mb/s). Those skilled in the art will appreciate that other subscriber bandwidth units are not beyond the scope of the present invention.

Electrical signals are communicated between the optical tap routing device 435 and respective tap multiplexers 440. The tap multiplexers 440 propagate optical signals to and from various groupings of subscribers. Each tap multiplexer 440 is connected to a respective optical transmitter 325. Each optical transmitter 325 can comprise one of a Fabry-Perot (F-P) laser, a distributed feedback laser (DFB), or a Vertical Cavity Surface Emitting Laser (VCSEL). However, other types of optical transmitters are possible and are not beyond the scope of the present invention. The optical transmitters produce the downstream optical signals that are propagated towards the subscriber optical interfaces 140.

Those skilled in the art will appreciate that the functions ascribed to the optical tap routing device 435 and the tap multiplexers 440 are exemplary in nature. In other words, functions may be performed differently than what is described. Some of the functions performed by the routing device 435 could be performed by the tap multiplexer 440, and vice-versa.

Each tap multiplexer 440 is also coupled to an optical receiver 370. From the bi-directional splitter 360, respective optical receivers 370 can convert the upstream optical signals into the electrical domain. Each optical receiver 370 can comprise one or more photoreceptors or photodiodes that convert optical signals into electrical signals. Since the optical transmitters 325 and optical receivers 370 can comprise off-the-shelf hardware to generate and receive respective optical signals, the transceiver node 120 lends itself to efficient upgrading and maintenance to provide significantly increased data rates.

Each optical transmitter 325 and each optical receiver 370 are connected to a respective bi-directional splitter 360. Each bi-directional splitter 360 in turn is connected to a diplexer 420 which combines the unidirectional optical signals received from the splitter 415 with the downstream optical signals received from respective optical receivers 370. In this way, broadcast video services as well as data services can be supplied with a single optical waveguide such as a distribution optical waveguide 150 as illustrated in FIG. 2. In other words, optical signals can be coupled from each respective diplexer 420 to a combined signal input/output port 445 that is connected to a respective distribution optical waveguide 150.

Unlike the conventional art, the transceiver node 120 does not employ a conventional router. The components of the transceiver node 120 can be disposed within a compact electronic packaging volume. For example, the transceiver node 120 can be designed to hang on a strand or fit in a pedestal similar to conventional cable TV equipment that is placed within the "last" mile or subscriber proximate portions of a network. It is noted that the term, "last mile," is a generic term often used to describe the last portion of an optical network that connects to subscribers.

Also because the optical tap routing device 435 is not a conventional router, it does not require active temperature controlling devices to maintain the operating environment at a specific temperature. In other words, the transceiver node 120 can operate in a temperature range between minus 40 degrees Celsius to 60 degrees Celsius in one exemplary embodiment.

While the transceiver node 120 does not comprise active temperature controlling devices that consume power to maintain temperature of the transceiver node 120 at a single temperature, the transceiver node 120 can comprise one or more passive temperature controlling devices 450 that do not consume power. The passive temperature controlling devices 450 can comprise one or more heat sinks or heat pipes that remove heat from the transceiver node 120. Those skilled in the art will appreciate that the present invention is not limited to these exemplary passive temperature controlling devices. Further, those skilled in the art will also appreciate the present invention is not limited to the exemplary operating temperature range disclosed. With appropriate passive temperature controlling devices 450, the operating temperature range of the transceiver node 120 can be reduced or expanded.

In addition to the transceiver node's 120 ability to withstand harsh outdoor environmental conditions, the transceiver node 120 can also provide high speed symmetrical data transmissions. In other words, the transceiver node 120 can propagate the same bit rates downstream and upstream to and from a network subscriber. This is yet another advantage over conventional networks, which typically cannot support symmetrical data transmissions as discussed in the background section above. Further, the transceiver node 120 can also serve a large number of subscribers while reducing the number of connections at both the data service hub 110 and the transceiver node 120 itself.

The transceiver node 120 also lends itself to efficient upgrading that can be performed entirely on the network side or data service hub 110 side. That is, upgrades to the hardware forming the transceiver node 120 can take place in locations between and within the data service hub 110 and the transceiver node 120. This means that the subscriber side of the network (from distribution optical waveguides 150 to the subscriber optical interfaces 140) can be left entirely in-tact during an upgrade to the transceiver node 120 or data service hub 110 or both.

Figure 4:
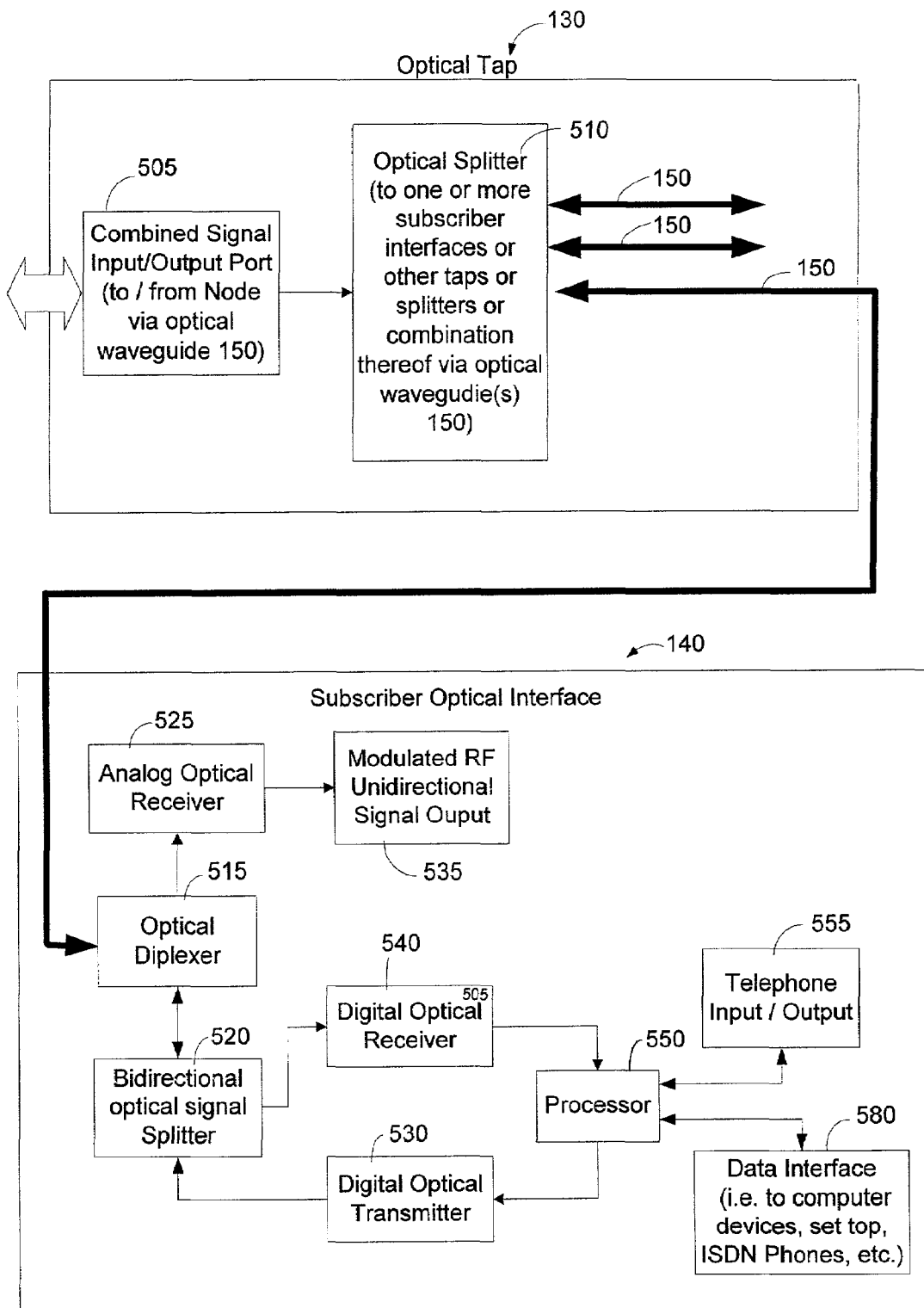
FIG. 4 is a functional block diagram illustrating an optical tap connected to a subscriber interface by a single optical waveguide according to one exemplary embodiment of the present invention.

Referring now to FIG. 4, this Figure is a functional block diagram illustrating an optical tap 130 connected to a subscriber optical interface 140 by a single optical waveguide 150 according to one exemplary embodiment of the present invention. The optical tap 130 can comprise a combined signal input/output port 505 that is connected to another distribution optical waveguide that is connected to a transceiver node 120. As noted above, the optical tap 130 can comprise an optical splitter 510 that can be a 4-way or 8-way optical splitter. Other optical taps having fewer or more than 4-way or 8-way splits are not beyond the scope of the present invention. The optical tap can divide downstream optical signals to serve respective subscriber optical interfaces 140. In the exemplary embodiment in which the optical tap 130 comprises a 4-way optical tap, such an optical tap can be of the pass-through type, meaning that a portion of the downstream optical signals is extracted or divided to serve a 4-way splitter contained therein, while the rest of the optical energy is passed further downstream to other distribution optical waveguides 150.

The optical tap 130 is an efficient coupler that can communicate optical signals between the transceiver node 120 and a respective subscriber optical interface 140. Optical taps 130 can be cascaded, or they can be connected in a star architecture from the transceiver node 120. As discussed above, the optical tap 130 can also route signals to other optical taps that are downstream relative to a respective optical tap 130.

The optical tap 130 can also connect to a limited or small number of optical waveguides so that high concentrations of optical waveguides are not present at any particular transceiver node 120. In other words, in one exemplary embodiment, the optical tap can connect to a limited number of optical waveguides 150 at a point remote from the transceiver node 120 so that high concentrations of optical waveguides 150 at a transceiver node can be avoided.

The subscriber optical interface 140 functions to convert downstream optical signals received from the optical tap 130 into the electrical domain that can be processed with appropriate communication devices. The subscriber optical interface 140 further functions to convert upstream electrical signals into upstream optical signals that can be propagated along a distribution optical waveguide 150 to the optical tap 130. The subscriber optical interface 140 can comprise an optical diplexer 515 that divides the downstream optical signals received from the distribution optical waveguide 150 between a bi-directional optical signal splitter 520 and an analog optical receiver 525. The optical diplexer 515 can receive upstream optical signals generated by a digital optical transmitter 530. The digital optical transmitter 530 converts electrical binary/digital signals to optical form so that the optical signals can be transmitted back to the data service hub 110. Conversely, the digital optical receiver 540 converts optical signals into electrical binary/digital signals so that the electrical signals can be handled by processor 550.

The present invention can propagate the optical signals at various wavelengths. However, the wavelength regions discussed are practical and are only illustrative of exemplary embodiments. Those skilled in the art will appreciate that other wavelengths that are either higher or lower than or between the 1310 and 1550 nm wavelength regions are not beyond the scope of the present invention.

The analog optical receiver 525 can convert the downstream broadcast optical video signals into modulated RF television signals that are propagated out of the modulated RF unidirectional signal output 535. The modulated RF unidirectional signal output 535 can feed to RF receivers such as television sets (not shown) or radios (not shown). The analog optical receiver 525 can process analog modulated RF transmission as well as digitally modulated RF transmissions for digital TV applications.

The bi-directional optical signal splitter 520 can propagate combined optical signals in their respective directions. That is, downstream optical signals entering the bi-directional optical splitter 520 from the optical the optical diplexer 515, are propagated to the digital optical receiver 540. Upstream optical signals entering it from the digital optical transmitter 530 are sent to optical diplexer 515 and then to optical tap 130. The bi-directional optical signal splitter 520 is connected to a digital optical receiver 540 that converts downstream data optical signals into the electrical domain. Meanwhile the bi-directional optical signal splitter 520 is also connected to a digital optical transmitter 530 that converts upstream electrical signals into the optical domain.

The digital optical receiver 540 can comprise one or more photoreceptors or photodiodes that convert optical signals into the electrical domain. The digital optical transmitter can comprise one or more lasers such as the Fabry-Perot (F-P) Lasers, distributed feedback lasers, and Vertical Cavity Surface Emitting Lasers (VCSELs).

The digital optical receiver 540 and digital optical transmitter 530 are connected to a processor 550 that selects data intended for the instant subscriber optical interface 140 based upon an embedded address. The data handled by the processor 550 can comprise one or more of telephony and data services such as an Internet service. The processor 550 is connected to a telephone input/output 555 that can comprise an analog interface. The processor 550 is also connected to a data interface 560 that can provide a link to computer devices, set top boxes, ISDN phones, and other like devices. Alternatively, the data interface 560 can comprise an interface to a Voice over Internet Protocol (VoIP) telephone or Ethernet telephone. The data interface 560 can comprise one of Ethernet's (10BaseT, 100BaseT, Gigabit) interface, HPNA interface, a universal serial bus (USB) an IEEE1394 interface, an ADSL interface, and other like interfaces.

Figure 5:
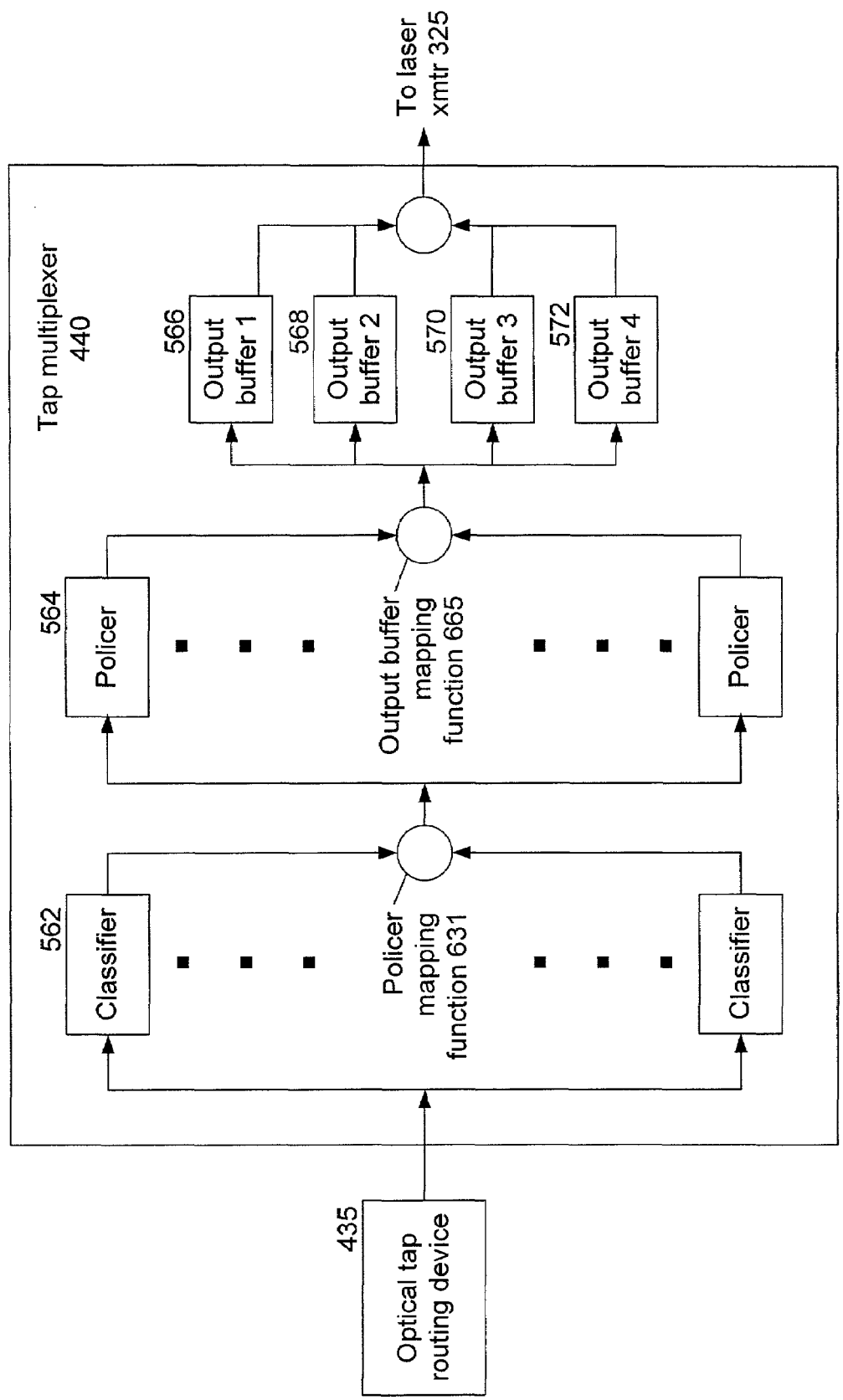
FIG. 5 is a functional block diagram illustrating an exemplary optical tap routing device coupled to an exemplary optical tap multiplexer according to the present invention.

Referring now to FIG. 5, this figure illustrates a functional block diagram of an exemplary optical tap routing device 435 and a tap multiplexer 440. This figure further illustrates the exemplary hardware that can be found in each tap multiplexer 440. However, those skilled in the art will recognize the present invention is not limited to the hardware illustrated nor is the present invention limited to a hardware embodiment. That is, software or other hardware or a combination thereof can be substituted for the elements described in FIG. 5 without departing from the scope and spirit of the present invention.

For downstream communications signals, the optical tap routing device 435 can route or divide or apportion data service hub signals according to the individual tap multiplexers 440 that communicate optical signals with one or more optical taps 130 and ultimately one or more subscriber optical interfaces 140 (not shown in FIG. 5). In the downstream direction, it is noted that tap multiplexer 440 receives electrical signals from the optical tap routing device 435. That is, the tap multiplexer 440 operates in the electrical domain to modulate laser transmitters in order to generate optical signals that are assigned to groups of subscribers coupled to one or more optical taps. The optical tap routing device 435, as noted above, can comprise a computer or hardwired apparatus that executes a program defining a protocol for communications with groups of subscribers assigned to individual ports. The optical tap routing device can assign multiple subscribers to a single port. More specifically the optical tap routing device can service groups of subscribers with corresponding respective, single ports. Attached to each port of the optical tap routing device 435 are tap multiplexer 440.

Tap multiplexer 440 can propagate optical signals to and from various groupings of subscribers. In one exemplary embodiment, a tap multiplexer 440 can comprise classifiers 562, policers 564, and a plurality of priority output buffers 566, 568, 570 and 572. A tap multiplexer 440 receives downstream data packets from the optical tap routing device 435. The classifiers 562 identify these outbound packets (outbound relative to the data service hub 110 of the optical network) and assign each packet to an appropriate class. In other words, each classifier 562 can select a packet based on the content of packet headers according to predefined rules.

Classes can be defined by the values of arbitrary bits in the packet header, and each classifier 562 can examine up to 40 bytes (or 320 bits) of each packet. Each classifier 562 can consider multiple fields of an individual packet, including the full Ethernet header, the full IP header, and the source and destination TCP or UDP ports. The Ethernet header can comprise a destination media access control (MAC) address as well as a source MAC address. Other headers available for classification include, but are not limited to, those fields listed in Table 1 below.

TABLE 1

Header Fields Available for Classification

| Ethernet Header (14 bytes) | destination MAC address | | |
|---|---|---|---|
| | source MAC address | | |
| | Ethernet type | | |

| IP Header (20 bytes) | vers hlen | diffsev | ECN | payload strength |
|---|---|---|---|---|
| | fragment identifier | | 0 DM FF | fragment offset |
| | hop limit | next header | | header checksum |
| | source IP address | | | |
| | destination IP address | | | |

| Partial UDP/TCP Header (6 bytes) | source UDP/TCP port | destination UDP/TCP port |
|---|---|---|
| | UDP message length | |

In one exemplary embodiment, the tap multiplexer 440 can comprise a plurality of separate classifiers 562 for each logical channel that supports a preassigned grouping of subscribers. That is, in one exemplary embodiment, each logical channel can support sixteen different subscribers. However, the present invention is not limited to this particular number of subscribers per logical channel. A fewer or an increased amount of subscribers can be assigned to each logical channel without departing from the scope and spirit of the present invention. Each classifier 562 can be configured with the following values: A 40-byte bit mask; a 40-byte check value; and a policer assignment.

Each policer 564 can be coupled to a corresponding classifier 562. However, in an alternative embodiment (not illustrated), multiple classifiers 562 may be coupled to a single policer 564. Each policer 564 may operate as a two-stage token bucket where the first stage bucket can enforce a configured peak rate for the down stream communication traffic. Peak rate can comprise the maximum rate that a subscriber (via a subscriber optical interface 140) is allowed to transmit downstream packets. Specifically, it may comprise the maximum rate at which the network will accept traffic bursts from the subscriber (via a subscriber optical interface 140), expressed in bits per second. At this first stage, non-conforming packets that do not match the peak rate set in a policer 564 can be discarded.

The second stage of each traffic policer 564 operating as a token bucket can identify packets that conform to a sustained rate. Sustained rate can comprise the minimum throughput that the network will provide to the user, expressed in bits per second (Bps). At the second stage of each policer 564, a burst size can also be evaluated. Burst size usually comprises the amount of traffic that the network will accept without pause at the user's peak rate, expressed in bits.

The classifiers 562 and policers 564 can comprise hardware such as applications specific integrated circuits (ASICs) or field programmable gate arrays (FPGAs). While the classifiers 562 and policers 564 may comprise ASICs or FPGAs, the present invention is not limited to these hardware devices. Other similar processing devices are not beyond the scope of the present invention. Further, as noted above, the present invention is not limited to the hardware illustrated and can also be embodied in software or a combination thereof, without the departing from the scope and spirit of the present invention.

In one exemplary embodiment, the classifiers 562 can distinguish different traffic classes based on the differentiated services code point (DSCP) in each packet's header. DSCP values are defined in RFC 2474, published by the internet engineering task force (IETF) available at the web site www.ietf.org. The six bits of the DSCP value is the successor to the so called "precedence" bits defined in RFC 791. The precedence definition is modified and expanded in RFC 2474. The relevant bits of the DSCP values are sometimes referred to as ToS (Type of Service) bits in IPv4 (the version of Internet Protocol most commonly used as of the filing of this document) and are called the traffic class octet in IPv6 (a newer version of the Internet Protocol not in widespread use on the public internet as of the filing date of this document).

Once the classifiers 562 have identified traffic with the desired DSCP values (or other parameters as described later in this description), they can pass the traffic to the appropriate policer 564. The policers 564 enforce a maximum transmission rate (also referred to as the peak rate), a minimum transmission rate (also referred to as the sustained rate), and maximum burst size for the downstream communication traffic. If the downstream traffic exceeds the maximum transmission rate, excess packets above that maximum transmission rate are discarded. If the downstream traffic exceeds the minimum transmission rate, excess traffic above that minimum transmission rate is marked as "out of profile."

The classifiers 562 can use DSCP values (or other parameters as mentioned later in this description) to determine the policer assignment and ultimately which priority buffer will handle a particular packet. As noted above, each policer 564 is associated with a particular output buffer that has a preset priority relative to other output buffers. The higher the priority buffer, the sooner or earlier the packet will be transmitted when more than one packet is ready for transmission to the subscribers because packets placed in higher priority output buffers are transmitted before packets in lower priority output buffers. By transmitting packets with high priority first, these packets have first access to the guaranteed bandwidth, meaning that they will be handled immediately, assuming adequate bandwidth is available.

Each priority output buffer 566, 568, 570, and 572 can comprise a first-in/first-out register (FIFO). However, the buffers of the present invention are not limited to FIFO registers. Other memory devices that function similar to FIFOs are not beyond the scope of the present invention. Further, the present invention is not limited to the number of buffers illustrated. More or fewer buffers could be used without departing from the scope of the present invention.

Referring now to FIG. 5, as each packet enters from the optical tap routing device 435, it is identified by one of the classifiers 562, based on a number of parameters that can be set by the operator. These parameters can comprise DSCP code values among other things as will be discussed below. An appropriate classifier 562, if any, selects the packet. Each classifier has a particular policer assignment that is given to a packet. Through the policer mapping function 631, the packet is transferred or mapped to the appropriate policer 564 based upon the policer assignment given by the classifier 562. More than one classifier 562 can assign packets to the same policer 564, but one classifier 562 usually may not assign packets to more than one policer. During a first stage (i.e., a first token bucket algorithm) of a policer 564, it determines if the packet is within an allowable peak data rate, as determined by its classification. If not, the packet is dropped. If the packet is within the allowed peak data rate then the policer's second stage (i.e., a second token bucket algorithm) determines if the packet is within a guaranteed or sustained rate and if the packet is within a burst size. All packets, whether or not they are within the guaranteed rate or burst size, are passed to one of the output buffers 566, 568, 570 or 572 via an output buffer mapping function 665. Each policer 564 passes packets to one output buffer. Any policer 564 may pass packets to any output buffer, but can usually pass packets only to one output buffer. The output buffer to which a particular policer passes packets is usually determined by the network service provider when he sets up his data traffic policies.

As noted above, one distinguishing feature of the policers 564 of the present invention is their relative physical location within the optical network as well as the type of data traffic that each policer 564 handles. As is understood to those skilled in the art, policers typically function at a network border (an ingress point) that ensures that a host does not violate its promised traffic characteristic. Policers of the conventional art typically limit the amount of traffic flowing into a network to achieve a specific policy goal. Policers of the conventional art typically monitor and control traffic as the traffic enters the network. However, according to the present invention, the policers 564 are employed within tap multiplexers 440 that are in close proximity to the subscribers.

Policers 564 of the present invention function at a network border, but at egress points rather than ingress points, compared to that of the conventional art. In this way, the policers 564 can control the volume or content (or both) of downstream communications that exit an optical network that are received by subscribers of the optical network. The control of volume or content (or both) is a result of the policers 564 evaluating the peak rate, sustained rate, and burst size of a packet. This control can also be attributed to a policer 564 assigning a packet with a particular weighted random early discard value. Those skilled in the art appreciate that Internet traffic can be slowed down if packets are dropped, so that if packets to a particular destination are being dropped, then eventually the rate at which packets leave the optical network of the present invention towards a destination (such as a subscriber) may be reduced.

As noted above, each policer 564 can be configured with the following exemplary values: a peak rate, a profile rate, a burst size, Weighted Random Early Discard (WRED) parameters for in-profile traffic, WRED parameters for out-of-profile traffic, and next stage output buffer assignment. While the burst size can comprise the amount of data the subscriber can receive at its peak rate without pause or delay, expressed in bits, the burst size can also comprise a special value to indicate that a subscriber has no limit on his or her burst size. The WRED parameters will be discussed in further detail below with respect to FIGS. 6 through 10.

Each output buffer 566, 568, 570, and 572 takes in packets after a respective buffer executes the weighted random early discard algorithm as each packet is presented to a particular buffer. Each output buffer can then send the packet downstream if that particular buffer is requested to release its stored packets. The first priority output buffer 566 can evaluate all packets which have been determined to have the highest priority, and hence should be transmitted first towards the subscribers during downstream processing. Successive output buffers have lower priority down to the lowest priority fourth output buffer 572.

As mentioned above, each priority output buffer separately implements a Weighted Random Early Discard (WRED) algorithm to determine if packets are admitted to the buffer or dropped. Each priority output buffer operates differently for traffic that conforms to the values assigned to a policer and for downstream traffic that does not conform to the values assigned to a particular policer.

Specifically, downstream traffic that is considered within preset parameters assigned to a policer by a network service provider (such as peak rate, sustained rate, and burst size) is subject to a Weighted Random Early Discard algorithm according to three parameters: A minimum threshold, a maximum threshold, and a maximum drop probability that is specific to in-profile traffic. The minimum threshold, maximum threshold, and maximum drop probability are assigned to each policer 564 by a network service provider.

For downstream traffic falling outside of a policer's preset parameters, this traffic is also subject to a Weighted Random Early Discard (WRED) algorithm according to three parameters: a minimum threshold, a maximum threshold, and a maximum drop probability that is specific to out-of-profile traffic and also assigned by each policer 564. As noted above, the minimum threshold, maximum threshold, and maximum drop probability are assigned to each policer 564 by a network service provider.

By using different values for the maximum drop probability for traffic falling within and outside a policer's preset values, this allows different traffic classes to be weighted differently. In effect, the service provider may assign traffic priority according to a WRED algorithm.

Once packets are stored in a particular priority output buffer, the packets are removed from each respective priority output buffer according to a predetermined policy or queuing discipline. Typically, packets are removed from any particular output buffer only when all higher priority output buffers are empty. For example, if packets are present in each of the priority output buffers 566, 568, 570 and 572, packets in the second priority output buffer 568 would not start being removed until all of the packets in the first priority output buffer 566 are removed. Similarly, packets stored in the third priority output buffer 570 would not be removed for downstream communications until all of the packets in the second priority output buffer 568 are removed. Such a queuing discipline or output buffer policy provides lower delay for high priority downstream traffic.

Figure 6:
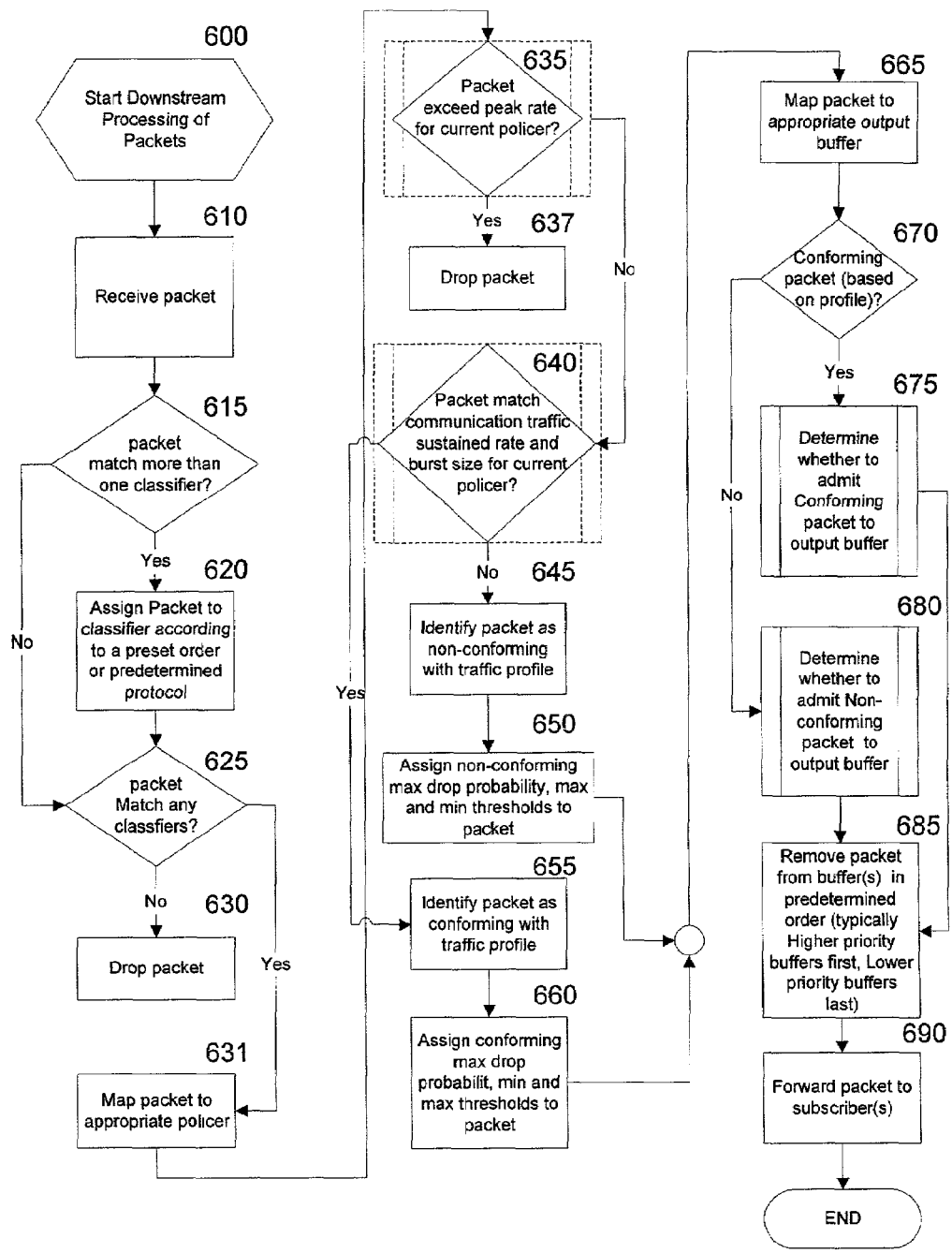
FIG. 6 is a logic flow diagram illustrating an exemplary method for processing downstream packets leaving or exiting a network according to one exemplary embodiment of the present invention.

Referring now to FIG. 6, this figure illustrates an exemplary method for handling downstream communications originating from a data service hub 110 of an optical network that are transmitted to subscribers of the optical network. Basically, FIG. 6 provides an overview of the processing performed by the optical tap routing device 435 and tap multiplexer 440 housed within the transceiver node 120.

The description of the flow charts that follows is represented largely in terms of processes and symbolic representations of operations by conventional computer components, including a processing unit (a processor), memory storage devices, connected display devices, and input devices. Furthermore, these processes and operations may utilize conventional computer components in a heterogeneous distributed computing environment, including remote file servers, computer servers, and memory storage devices. Each of these conventional distributed computing components can be accessible by the processor via a communication network.

The processes and operations performed below may include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The logic flow described in FIG. 6 can be the core logic or top level processing and can be executed repeatedly. The logic flow diagram illustrated in FIG. 6 illustrates a process that can occur after initialization of the software or hardware components or both illustrated in FIGS. 1–5.

For example, in an object-oriented programming environment, software components or software objects or hardware that could be used to perform the steps illustrated in FIG. 6 can be initialized or created prior to the process described in FIGS. 4 and 5. Therefore, one of ordinary skill in the art recognizes that several steps pertaining to initialization of software objects or hardware described in FIGS. 1 through 5 may not be illustrated.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions. Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented process will be explained in more detail in the following description in conjunction with the remaining Figures illustrating the process flow.

Certain steps in the processes or process flow described below must naturally precede others for the present invention to function as described. However, the present invention is not limited to the order of the steps described if such order or sequence does not alter the functionality of the present invention. That is, it is recognized that some steps may be performed before or after other steps without departing from the scope and spirit of the present invention.

Step 610 is the first step in the exemplary method 600 processing downstream communications. In step 610, a packet is received from the optical tap routing device 435 by tap multiplexer 440.

In decision step 615, it can be determined whether a packet matches more than one classifier 562 of a particular tap multiplexer 440. If the inquiry to decision step 615 is positive then the "yes" branch is followed to step 620 in which the packet is assigned to one of the matching classifiers 562 according to an order that can be established by the service provider. If the inquiry to decision step 615 is negative, then the "no" branch is followed to decision step 625.

In decision step 625, it is determined whether a packet matches any of the classifiers 562 of a particular tap multiplexer 440. If the inquiry to decision step 625 is negative, then the "no" branch if followed to step 630 in which the packet if dropped. If the inquiry to decision step 625 is positive, then the "yes" branch is followed to step 631.

In step 631, the packet is mapped to the appropriate policer 564 that is associated with the classifier 562 that previously processed the packet. As noted above, each classifier 562 is assigned to a single policer 564. Each policer 564 is typically associated with a single classifier 562 and a single priority output buffer.

In decision step 635, each respective policer 564 can determine whether a packet exceeds a peak rate for the destined subscriber. As noted above, peak rate can comprise the maximum rate that a subscriber is allowed to receive downstream packets. Specifically, it may comprise the maximum rate at which the network will accept traffic bursts bound to the user, expressed in bits per second. Decision step 635 is highlighted with a dashed routine symbol to indicate that it comprises a first stage token bucket algorithm for evaluating the peak rate for a subscriber. Those skilled in the art are familiar with token bucket algorithms. One reference which describes such bucket algorithms is the following publication: "Policing and Shaping Overview," published by Cisco Systems, Inc., pages QC 87–QC 98. Another exemplary publication describing token bucket algorithms is the following white paper: "Cisco IOS(TM) Software Quality of Service Solutions," published by Cisco Systems, Inc., copyright 1998. The contents of both these reference are incorporated fully herein by reference.

If the inquiry to decision step 635 is positive, then the "yes" branch if followed to step 637 in which the packet is dropped. If the inquiry to decision step 635 is negative, then the "no" branch is followed to decision step 640.

In decision step 640, a policer 564 can determine if a packet matches a sustained rate and burst size. Decision step 640 is also highlighted with a dashed routine symbol to indicate that it comprises a second stage token bucket algorithm for evaluating the peak rate for a subscriber. As noted above, those skilled in the art are familiar with token bucket algorithms and therefore, a detailed discussion of these algorithms will not be provided. The reader is referred to the aforementioned token bucket algorithm publications which are fully incorporated herein by reference. If the inquiry to decision step 640 is negative, then the "no" branch is followed to step 645 in which the packet is identified as non-conforming with burst size or sustained rate assigned to the policer 564 by a network administrator. Next, in step 650 the policer 564 can assign a "non-conforming" maximum drop probability, a maximum threshold, and minimum threshold to the packet that is specific to traffic that is determined as "out-of-profile" meaning that the packet is outside (greater than) the policer's burst size or sustained rate.

If the inquiry to decision step 640 is positive, then the "yes" branch is followed to step 655 in which the policer 564 can identify the packet as conforming with a traffic profile for a particular classifier 562. Next, in step 660, a policer 564 can assign a conforming maximum drop probability, a maximum threshold, and a minimum threshold to the packet that is specific to traffic that is determined as "in-profile" meaning that the packet is within the policer's burst size and sustained rate.

In step 665, the packet is mapped to the appropriate output buffer. Typically, each policer 564 is associated with a particular output buffer 566, 568, 570, and 572. In decision step 670, each priority output buffer can determine whether a packet is identified as either in-profile traffic or out-of-profile traffic. If the inquiry to decision step 670 is positive, meaning that a particular packet matches the burst size or sustained rate assigned to the policer then the "yes" branch is followed to routine 675 in which a particular output buffer determines whether to admit the conforming packet to the assigned output buffer. Further details of routine 675 will be discussed below with respect to FIG. 7.

If the inquiry to decision step 670 is negative, meaning that a packet does not conform with the sustained rate or burst size assigned to a policer 564, then the "no" branch is followed to routine 680 in which the particular output buffer determines whether to admit the nonconforming packet to the assigned output buffer. Further details of routine 680 will be discussed below with respect to FIG. 8.

In step 685, the packets admitted to the buffers are removed in a predetermined order as discussed above. Typically, this predetermined order comprises removing packets from higher priority buffers first and then removing packets from lower priority buffers last. In step 690, the packets are forwarded to the subscribers.

Figure 7:
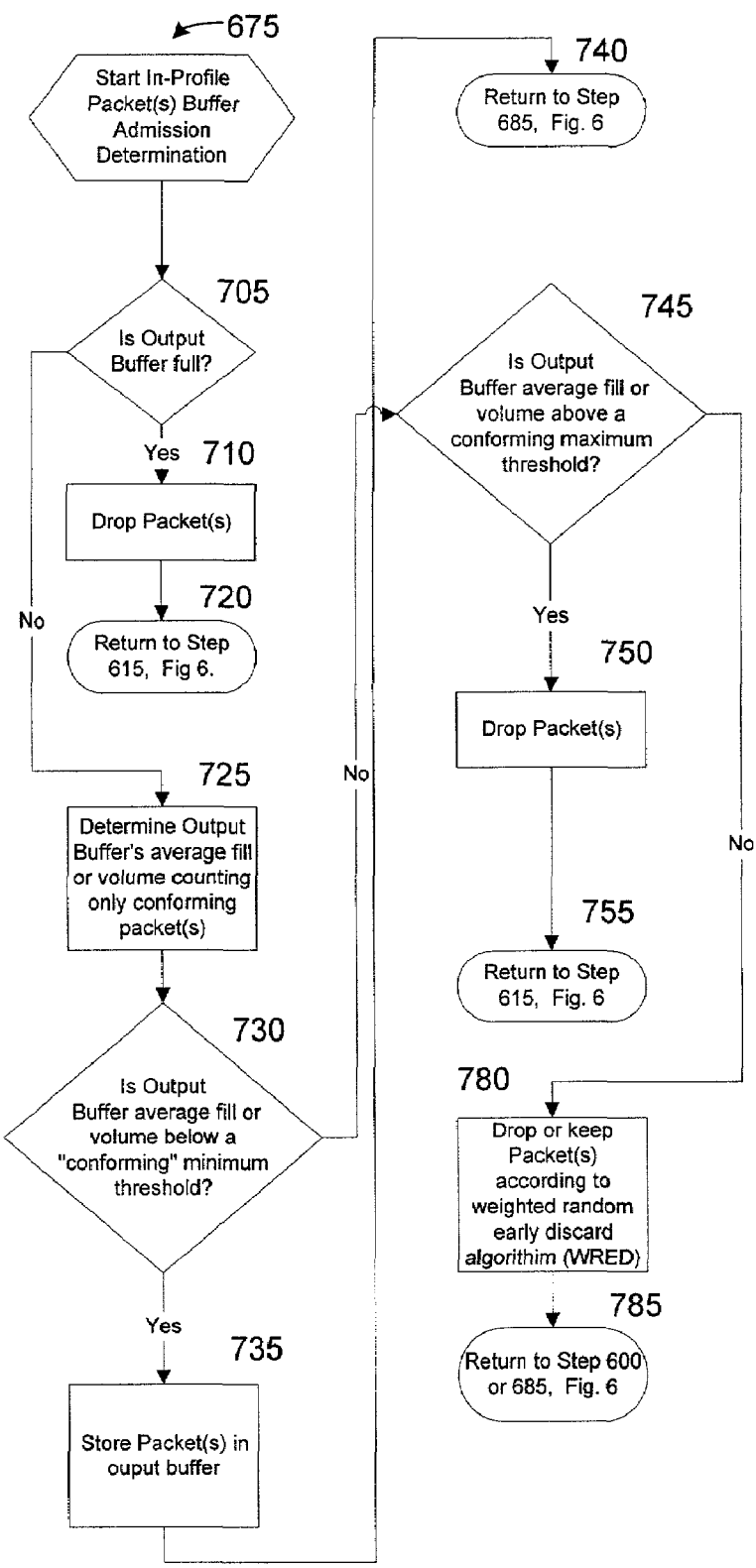
FIG. 7 is a logic flow diagram illustrating an exemplary sub-process for evaluating in-profile packets according to one exemplary embodiment of the present invention.

Referring now to FIG. 7, this figure illustrates an exemplary subprocess 675 for determining whether to admit in-profile packets into a particular priority output buffer. This figure provides an overview of the processing performed by each of the priority output buffers.

Certain steps in the process described below must naturally proceed others for the present invention to function as described. However, the present invention is not limited to the order of the steps described in such order of sequence of steps does not alter the functionality of the present invention. That is, it is recognized that some steps may be performed before or after other steps without departing from the scope and spirit of the present invention.

Step 705 is the first step in the exemplary method 675 for admitting in-profile packets to a particular priority output buffer. In step 705, it is determined whether the particular output buffer of interest is full. If the inquiry to decision step 705 is positive, then the "yes" branch is followed to step 710 in which the packet or series of packets are dropped. Then in step 720, the process returns to step 600 of FIG. 6.

If the inquiry to decision step 705 is negative, then the "no" branch is followed to step 725 in which the receiving output buffer's average fill or current volume is determined. In step 725, the output buffer's average fill or average current volume is computed by only counting conforming packets. In other words, the output buffer's average current volume is calculated based only upon those packets conforming with a particular communication traffic profile.

In decision step 730, it is determined whether the calculated output buffer average fill or volume is below a "conforming" minimum threshold. If the inquiry to decision step 730 is positive, then the "yes" branch is followed to step 735 in which the packet is stored in the output buffer. Next, in step 740, the process returns to step 685 of FIG. 6.

If the inquiry to decision step 730, is then negative, then the "no" branch is followed to the decision step 745 in which it is determined whether the calculated output buffer average fill or volume is above a "conforming" maximum threshold. If the inquiry to decision step 745 is positive, then the "yes" branch is followed step 750 in which the packet is dropped. The process then returns to step 615 of FIG. 6.

Figure 10:
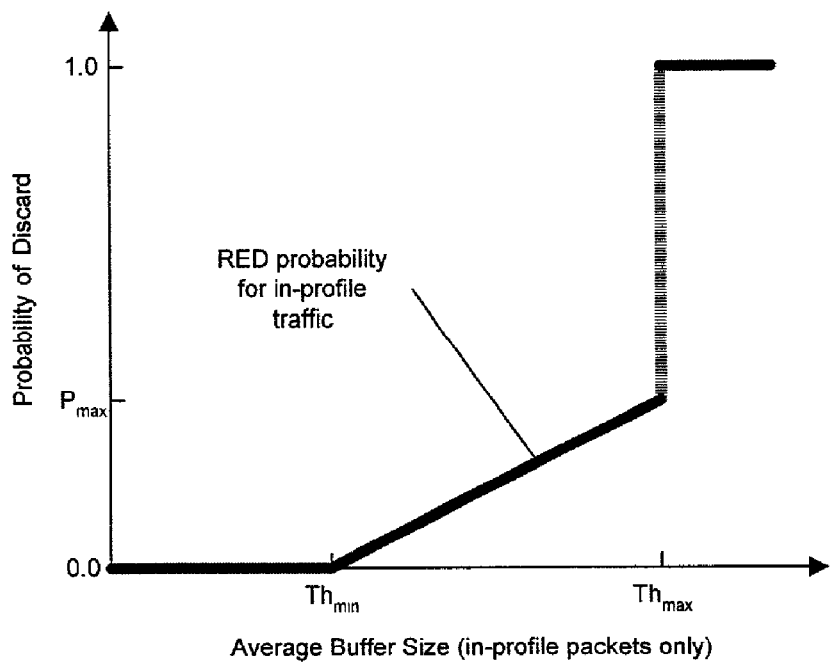
FIG. 10 is a graph illustrating weighted random early discard for in-profile packets according to one exemplary embodiment of the present invention.

If the inquiry to decision step 745 is negative, then the "no" branch is followed to step 760 in which the packet can be dropped according to a Weighted Random Early Discard (WRED) algorithm. The WRED algorithm typically uses an exponentially weighted moving average estimator to compute the average output buffer (queue) fill or volume which in turn typically smoothes out any bursty packet flow. The probability of packet drop typically increases as the average queue or buffer fill or volume increases. A packet is typically discarded with a probability that varies linearly from zero (when the average buffer volume is at the minimum threshold) to the configured maximum drop probability (when the average buffer volume is at the maximum threshold). FIG. 10 illustrates the WRED algorithm in a graphical fashion for in-profile or conforming downstream traffic.

The WRED algorithm uses an exponentially weighted moving average to calculate the average buffer size as discussed above. The measurement of the average buffer size is updated each time a packet is presented for admission to a particular priority output buffer or queue. The algorithm updates the average buffer size by using the previous value and an instantaneous value of the average buffer size, according to the equation listed below:

$$Q\text{avg} = (255/256 \cdot Q\text{avg}) + (1/256 \cdot Q\text{inst})$$

where Qavg is the average buffer size; and Qinst is the instantaneous average buffer size.

As FIG. 10 illustrates, when the average buffer size or queue depth is above a minimum threshold ($Th_{min}$), the WRED algorithm starts dropping packets. The rate of packet drop typically increases linearly as the average buffer or queue fill/volume increases until the average queue size reaches a maximum threshold ($Th_{max}$). In FIG. 10, $P_{max}$ denotes the maximum drop probability assigned to the current packet by a policer 564.

Figure 8:
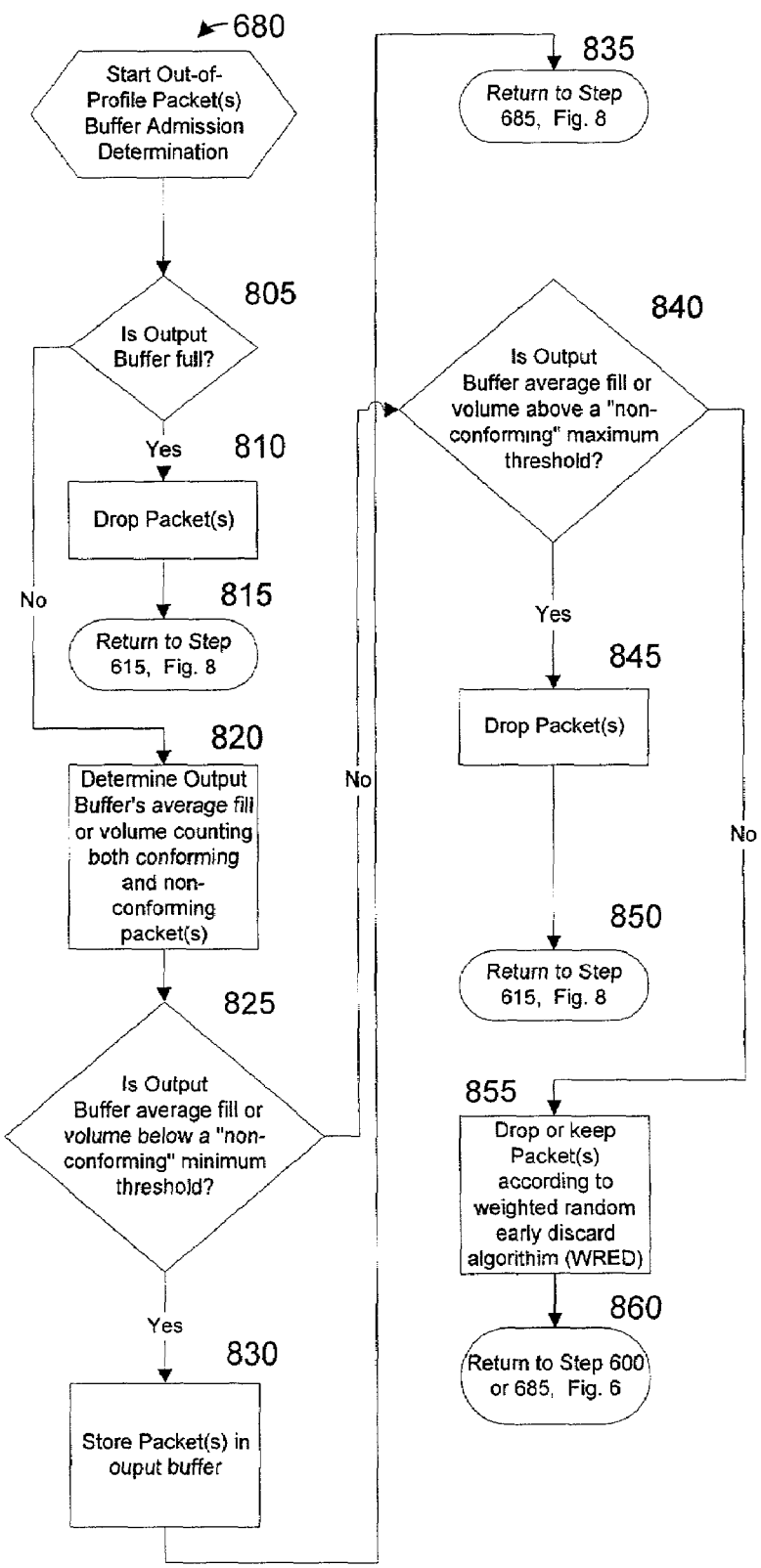
FIG. 8 is a logic flow diagram illustrating an exemplary sub-process for evaluating out-of-profile packets according to one exemplary embodiment of the present invention.

Referring now to FIG. 8, this figure illustrates an exemplary subprocess 680 for admitting out-of-profile packets to a particular buffer. This figure provides an overview of processing performed by priority output buffers for out-of-profile packets.

Certain steps in the process described below must naturally proceed others for the present invention to function as described. However, the present invention is not limited to the order of steps described in such order or sequence does not alter the functionality of the present invention. That is, it is recognized that some steps may be performed before or after other steps without departing from the scope and spirit of the present invention.

Step 805 is the first step in exemplary subprocess 680 of admitting out-of-profile packets to a priority output buffer. In step 805, it is determined whether the particular output buffer of interest is full. If the inquiry to decision step 805 is positive, then the "yes" branch is followed to step 810 in which the packet is dropped. Next, in step 815, the process returns to step 605 of FIG. 6.

If the inquiry to decision step 805 is negative, then the "no" branch is followed to step 820 in which the output buffer's average fill or current volume is calculated. In step 820, the output buffer's average volume is calculated by counting both conforming and non-conforming packets.

In decision step 825, it is determined whether the output buffer average fill or volume is below a "non-conforming" minimum threshold. If the inquiry to decision step 825 is positive, then the "yes" branch is followed to step 830 in which the packets are stored in the output buffer. Next, in step 835, the process returns to step 605 of FIG. 6.

If the inquiry to decision step 825 is negative, then the "no" branch is followed to decision step 840 in which it is determined whether the output buffer average fill or volume is above a "non-conforming" maximum threshold. If the inquiry to decision step 840 is positive, then the "yes" branch is followed to step 845 in which the packet or series of packets are dropped. In step 850, the process returns to step 605 of FIG. 6.

If the inquiry to decision step 840 is negative, then the "no" branch is followed to step 855 in which the one or more packets are dropped according to a Weighted Random Early Discard algorithm (WRED), as discussed above. However, the WRED algorithm for step 855 uses different parameters than does the WRED algorithm of step 760 of FIG. 7. The difference lies in the maximum probability drop value ($P_{max}$) and the minimum and maximum threshold values $Th_{max}$ and $Th_{min}$. See FIG. 10 for definitions of terms. As noted above with respect to step 820 of subprocess 680, an output buffer's average fill or volume is computed counting both conforming and non-conforming packets.

On the other hand, in step 725 of FIG. 7, an output buffer's average fill or volume is computed counting only conforming packets which match the communication traffic profile rate for a particular subscriber. Another difference exists in the threshold values assigned to in-profile traffic and out-of-profile traffic. The threshold values for in-profile traffic are different from those of out-of-profile traffic.

Figure 9:
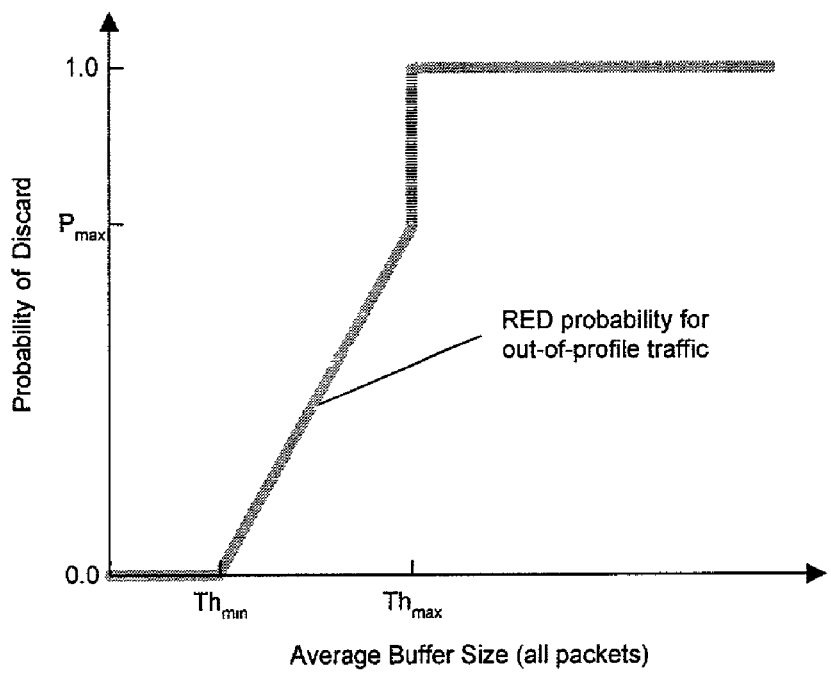
FIG. 9 is a graph illustrating weighted random early discard for out-of-profile packets according to one exemplary embodiment of the present invention.

By using multiple values for the maximum drop probability as well as adjusting the threshold values for in-profile traffic and out-of-profile traffic, specific traffic classes can be weighted differently. In effect, such a feature lets a service provider assign traffic priority over other types of traffic. As long as the output buffer size is between the configuration thresholds, the probability of a packet being dropped is directly proportional to the maximum drop probability that the service provider assigns to it. As FIG. 9 illustrates (compared to FIG. 10), the threshold values for $Th_{min}$, $Th_{max}$, for out of profile traffic are generally lower than for in-profile traffic, and the maximum drop probability is higher for this out-of-profile traffic.

Implementing Downstream QoS Policy

The present invention allows service providers to define powerful and flexible quality of service management rules. The following describes how to use those rules in practice. Several aspects of QoS policy, including, but not limited to, prioritization, mapping of backbone priorities, and subscriber bandwidth limitations can be implemented with the present invention.

Voice Traffic

In many environments, some traffic may be given higher priority than others. Voice over IP and TDM over IP packets, for example, can benefit if given priority over normal data traffic. Both of these traffic types are destined for the subscriber optical interfaces (SOIs) 140, rather than for subscriber equipment attached to the Subscriber Optical interfaces.

To ensure that this traffic receives an appropriate priority, it can be assigned to one or more classifiers. Since all such packets typically have the SOI 140 itself as the IP and MAC destination, one convenient classification relies on the IEEE Organizationally Unique Identifier (OUI) in the destination MAC address. In one exemplary embodiment, these three bytes can have the value $00060D_{16}$.

The subscript 16 of the previous value indicates that the number is expressed in that base. Similarly other numbers are expressed in base 2 and in base 10, and are similarly identified to reduce any possible confusion. These bases are well understood by those skilled in the art. All mask and values shown below are understood to be expressed in base 16. The classifier mask and value, therefore, can be set to the following values:

Mask 1: FFFFFF00000000000000000000000
00000000000000000000000000000000000000
000000000000

Value 1: 00060D00000000000000000000000
00000000000000000000000000000000000000
000000000000

Those skilled in the art understand the mask and value to correspond to the sections of Table 1 of this description. Each character represents four bits of the corresponding value in table 1, expressed in base 16. Thus, each character in the mask and the value represent four bits of the four bytes (32 bits) occupying space from left to right in each row of Table 1. The first line of the mask represents the Ethernet header (14 bytes, so 28 characters in the mask and value). The next line represents the 20 bytes of the IP header of Table 1, and the last row represents the partial UDP/TCP header (6 bytes).

When the base 16 characters of the mask are converted to binary, a binary 1 represents a bit position that will be tested by the value, and a binary 0 represents a bit position that will not be checked. When the "value" characters are converted to binary, all "value" bit positions where there is a binary 1 in the mask, usually must be the same as the corresponding bit in the packet header, for the a classifier to accept the packet. If one or more of the bits are not the same, then the packet does not meet that classification, and drops to the next classifier. If it matches none of the classifiers, it is dropped. This is understood by those skilled in the art.

A single policer 564 can manage the bandwidth for the traffic represented by mask 1 and value 1. This is true even if a plurality of subscribers are receiving this type of traffic.

A typical residential deployment will support voice calls but not TDM over IP. Each voice call usually requires about 156.8 kbit/s of bandwidth. (This bandwidth assumes G.711 codec and 5 ms sampling interval. Bandwidth includes the RTP, UDP, IP, and MAC headers and trailers, but not the preamble or inter-frame gap.)

For this example, assume the policer 564 needs to consider up to two simultaneous calls for each of 16 subscribers, plus allowance for other traffic to the SOI 140 (e.g. network management). The total bandwidth requirement is about 6 Mbit/s.

Since voice traffic is typically a constant bit rate, little burst capability is needed. Assume, as a worst case, that two samples for each call arrive consecutively. At 784 bits per packet, that would likely represent a burst of just over 25 kbit. Doubling this value to allow for network management and other overhead yields a burst limit of 50 kbit.

The policer 564 for this traffic, therefore, may be configured as follows:
  Peak Rate 1: 9 Mbit/s
  Profile Rate 1: 6 Mbit/s
  Burst Limit 1: 50 kbit Since voice traffic is particularly delay sensitive, it may be assigned to the highest output buffer or first priority output buffer 566.

The peak rate 1 above is related to the first stage of the token bucket in the policer 564. That first stage token bucket in step 635 in FIG. 6 would be set to 9 Mbit/s by having tokens added at that rate. The profile rate 1 represents the second stage token bucket (step 640), which token bucket is filled at the rate corresponding to 6 Mbit/s. The burst limit determines how much data can pass at one time, and is the number of tokens in the second stage token bucket. In the example, the second stage token bucket can hold a maximum number of tokens representing 50 kbits of data.

Mapping Backbone Priorities

If a service provider uses, for example, diffserv code points to mark high priority traffic on its backbone, a similar approach can be used to prioritize traffic across the Optical Network. The expedited forwarding (EF) per hop behavior (PHB), for example, uses the diffserv code point value of $101110_2$. A classifier can be easily defined to identify this traffic.
  Mask 2: 000000000000000000000000FFFF
  00FC00000000000000000000000000000000
  000000000000
  Value 2: 00000000000000000000000800
  00B80000000000000000000000000000000000
  000000000000

As an example, assume that expedited forwarding traffic is limited to 1000 Mbit/s, with normal rates of 100 Mbit/s and bursts up to 1 second in duration.
Peak Rate 2: 1000 Mbit/s
Profile Rate 2: 100 Mbit/s
Burst Limit 2: 100 Mbit Since expedited forwarding presumes high priority, this traffic may be assigned to the highest priority output buffer or first priority output buffer 566. (This output buffer can be the same as used for voice and TDM traffic as discussed above.)

Blocking Applications

Service providers may wish to completely block specific applications from their network. One way to do that is to assign those applications zero bandwidth. Consider, as an example, a provider that wishes to ban Napster traffic (Digital Music file sharing or other bulk file transfers) on its network. Napster servers typically use ports $7777_{10}$, $8875_{10}$, and $8888_{10}$, so identifying all traffic from Napster servers can require three classifiers. Note that these classifiers, in addition to looking at TCP port numbers can also ensure that the datagrams (the data contained in the packets) are not fragments, other than the first of two packets across which one longer datagram was fragmented. This is understood by those skilled in the art.
  Mask 3: 000000000000000000000000FFFF
  0F00000000001FFF00FF0000000000000000000
  FFFF000000000
  Value 3: 00000000000000000000000800
  0500000000000000006000000000000000000
  1E6100000000
  Mask 4: 000000000000000000000000FFFF
  0F00000000001FFF00FF0000000000000000000
  FFFF00000000
  Value 4: 00000000000000000000000800
  0500000000000000006000000000000000000
  22AB00000000
  Mask 5: 000000000000000000000000FFFF
  0F00000000001FFF00FF0000000000000000000
  FFFF00000000
  Value 5: 00000000000000000000000800
  0500000000000000006000000000000000000
  22B800000000

All three of these classes can be assigned to a single policer. It is noted that this is an example of three classifiers 562 supplying packets to a single policer 564. The bandwidth assignment is straightforward.
  Peak Rate 3: 0 Mbit/s
  Profile Rate 3: 0 Mbit/s
  Burst Limit 3: 0 Mbit The priority queue assignment for this traffic is irrelevant. For convenience, it may be assigned the lowest priority queue or fourth priority output buffer 572.

Rate Limiting Traffic Types

The present invention can also limit the bandwidth of particular traffic types. For example, a service provider may wish to limit multicast streaming to 200 Mbit/s across all subscribers on a logical channel. Multicast traffic has an IP destination address whose first four bits are $1110_2$, and the Real Time Streaming Protocol (used as the basis for Apple QuickTime and Real Networks RealVideo) typically uses destination port 554. To identify multicast RTSP packets, the following exemplary classifier configuration can be used:
  Mask 6: 000000000000000000000000FFFF
  0F00000000001FFF00FF000000000000F0000000
  0000FFFF0000
  Value 6: 00000000000000000000000800
  050000000000000000011000000000000E0000000
  0000022A0000

The rate governor for this traffic may be configured for 200 Mbit/s with a burst limit of 1.5 seconds.
  Peak Rate 4: 250 Mbit/s (note that this exemplary peak rate is arbitrary, since speeds over 200 Mbits/s are not to be allowed.)
  Profile Rate 4: 200 Mbit/s
  Burst Limit 4: 300 Mbit Streaming applications are somewhat delay sensitive, so it may be beneficial to assign this traffic the second highest priority or second priority output buffer 568.

Protecting Against Denial of Service Attacks

A common type of denial of service attack relies on flooding the victim with ICMP Internet Control Message Protocol (ICMP)—used for internal housekeeping on the Internet) requests. Since legitimate uses of ICMP diagnostics require only a small amount of bandwidth, limiting the rate of ICMP traffic can protect against ICMP-based denial of service attacks. ICMP messages usually have a protocol value of 1 in the IP header.
  Mask 7: 00000000000000000000000FFFF
  00000000000000000FF00000000000000000
  000000000000
  Value 7: 00000000000000000000000800
  000000000000000001000000000000000000
  000000000000
  Peak Rate 5: 256 Kbit/s
  Profile Rate 5: 256 Kbit/s
  Burst Limit 5: 0 bit
  ICMP traffic can be safely directed to the lowest priority queue, or fourth output buffer 592.

Prioritizing Premium Services

Service Providers working with businesses may wish to give priority to key business services such as virtual private networks (VPNs). The present invention makes it easy to identify and prioritize that traffic. For example, two common and conventional VPN protocols are Microsoft's PPTP and the standard L2TP. Both can be easily classified. PPTP traffic typically uses either TCP port 1723 or generic routing encapsulation (IP protocol 47). L2TP traffic typically uses UDP port 500 for key exchange and UDP port 1701 for user traffic. The following are exemplary masks and check values for four classifiers that can identify this traffic:
  Mask 8: 00000000000000000000000FFFF
  0F00000000001FFF00FF0000000000000000
  FFFF00000000
  Value 8: 00000000000000000000000800
  050000000000000000600000000000000000
  06BB00000000
  Mask 9: 00000000000000000000000FFFF
  000000000000000FF000000000000000000
  000000000000
  Value 9: 00000000000000000000000800
  000000000000000002F000000000000000000
  000000000000
  Mask 10: 00000000000000000000000FFFF
  0F00000000001FFF00FF0000000000000000
  FFFF00000000
  Value 10: 00000000000000000000000800
  05000000000000000011000000000000000000
  01F400000000
  Mask 11: 00000000000000000000000FFFF
  0F00000000001FFF00FF0000000000000000
  FFFF00000000
  Value 11: 00000000000000000000000800
  05000000000000000011000000000000000000
  06A500000000

The peak and profile rates for each subscriber may be assigned according to the service level agreement.

Subscriber Bandwidth Assignments

A key feature of the present invention is detailed management of bandwidth assigned to each subscriber. The flexibility offered by the present invention system in this area is nearly unlimited; the following merely shows a representative example.

For this exemplary embodiment, the service provider can define three levels of service for Internet access—premium, standard, and entry. The entry-level service can be roughly comparable to existing cable modem and digital subscriber line (DSL) services. It can offer 1 Mbit/s of bandwidth and best-effort delivery. The standard service can provide Ethernet-equivalent performance: 10 Mbit/s of bandwidth and best-effort delivery. The premium service can double the bandwidth—to 20 Mbit/s—and it can offer priority delivery. Premium traffic can be prioritized ahead of standard and entry-level traffic.

With such service definitions the QoS configuration can be relatively straightforward. Traffic classifiers can match the destination IP subnetwork of each subscriber. For example, suppose that 16 subscribers are each given 28-bit subnetworks from the 10.0.0.0 range. (Subscriber 1 is 10.0.0.0/28, subscriber 2 is 10.0.0.16/28, and so on, all the way to 10.0.0.240/28. The /28 indicates that only the first 28 bits of the address are represented.) A total of 16 classifiers is needed to distinguish all 16 subscribers:
  Mask 12: 00000000000000000000000FFFF
  00000000000000000000000000000FFFFFFF0
  000000000000
  Value 12: 00000000000000000000000800
  00000000000000000000000000000A000000
  000000000000
  Mask 13: 00000000000000000000000FFFF
  00000000000000000000000000000FFFFFFF0
  000000000000
  Value 13: 00000000000000000000000800
  00000000000000000000000000000A000010
  000000000000
  Mask 26: 00000000000000000000000FFFF
  00000000000000000000000000000FFFFFFF0
  000000000000
  Value 26: 00000000000000000000000800
  00000000000000000000000000000A0000E0
  000000000000
  Mask 27: 00000000000000000000000FFFF
  00000000000000000000000000000FFFFFFF0
  000000000000
  Value 27: 00000000000000000000000800
  00000000000000000000000000000A0000F0
  000000000000

For each subscriber, the rate governors can be defined according to the service they receive. In this example, premium subscribers can burst to 150% of their normal rate, while other subscribers are limited to the normal rate.
  Peak Rate "Premium": 30 Mbit/s
  Profile Rate "Premium": 20 Mbit/s
  Burst Limit "Premium": 30 Mbit
  Peak Rate "Standard": 10 Mbit/s
  Profile Rate "Standard": 10 Mbit/s
  Burst Limit "Standard": 15 Mbit
  Peak Rate "Value": 1 Mbit/s
  Profile Rate "Value": 1 Mbit/s
  Burst Limit "Value": 1.5 Mbit Premium subscribers can have their traffic assigned to the third highest priority queue or third party output buffer 570, while standard and value subscribers can be assigned to the lowest priority or fourth priority output buffer 572.

Backbone Networks Integration

Quality of service (QoS) is most powerful when it can be managed globally across an entire network, and the present invention provides unparalleled opportunities for global QoS management across an entire backbone network. The basis for this integration is IP's differentiated services (diffserv) architecture.

Application Support for Diffserv

SOIs 140 can support two applications that can significantly benefit from quality of service support: voice over IP and T1/E1 over IP. In both cases, the service provider can configure the application to mark its packets with a particular diffserv code point. These settings allow either application to take advantage of expedited forwarding, assured forwarding, or class selector prioritization throughout the IP network with the present invention. In addition, the SOI's VoIP implementation supports the setting of DSCP values on a call-by-call basis on command of the media gateway controller. This feature allows, for example, giving special priority to specific calls (e.g. E911 service).

Creating Service Level Agreements

The Transceiver Node (TN) 120 provides extensive support for managing service level agreements (SLAs) with subscribers. Although the TN 120 is necessarily only one component in an overall agreement, as the access network, it is critical. The following examines how the TN contributes to SLAs and how the above teaching can support SLAs through its so-called quality of service (QoS) and management functionality.

Components of an SLA

Service level agreements are typically more common with private network technologies such as ATM or Frame Relay. The power and flexibility of the TN's 120 QoS management, however, permits those same concepts to be extended to IP access networks. The same components that are part of traditional ATM or Frame Relay SLAs can be part of an TN-managed SLA.

Definitions Used Herein

Peak Rate. The maximum rate at which the network will accept traffic bursts from the user, expressed in bits per second. The network discards traffic that exceeds the peak rate.

Sustained Rate. The minimum throughput that the network will provide to the user, expressed in bits per second.

Burst Size. The amount of traffic that the network will accept without pause at the user's peak rate, expressed in bits.

Maximum Latency. The worst-case delay the user's traffic will experience as it traverses the network.

Loss Rate. The percentage of traffic conforming to the peak rate, sustained rate, and burst size that the network may discard.

Of course, service providers can include other elements in their service level agreements. The Transceiver Node 120 provides a wealth of features that a service provider may position as value-added services. The TN 120 supports services such as the following:

Application Prioritization. Giving priority to key network applications (e.g. Virtual Private Network traffic).

Enhanced Statistics. Providing detailed traffic profiles and statistics to assist the user in network growth planning.

Active Monitoring. Continuously monitoring user traffic to provide early detection of network application faults (e.g. Web server failures).

Network Security. Providing encryption of traffic to the subscriber.

This part of the description focuses on traditional SLA performance metrics. It examines how the Laser Transceiver Node 120 contributes to network performance, and how to provision downstream QoS management to meet SLA requirements. The table below lists key parameters and values used in equations throughout this part of the description.

| Inherent Link Characteristics | | |
|---|---|---|
| C | Link Capacity (500 Mbit/s) | |
| τ | Superframe Period (8 ms) | |

Rigorous SLAs and Oversubscription

Because business requirements differ among service providers and among subscribers, the Transceiver Node 120 allows providers significant flexibility in enforcing SLA performance metrics. Some deployments can require ironclad service level agreements; those environments require a conservative provisioning strategy. Conservative provisioning can provide extremely tight performance guarantees, but it generally results in a lower overall network utilization and, ultimately, greater capital expenditures.

In other deployments (residential Internet access, for example) SLAs are not common and may not be desirable. In those environments a more aggressive provisioning strategy may be effective. In general, meaningful SLAs are usually not enforceable when a network is provisioned aggressively; the resulting networks, however, may be operated at much higher utilization.

This part of the description considers both strict SLAs and slightly relaxed SLAs. Relaxed SLAs allow a modest amount of oversubscription of network resources; in exchange, the service provider cannot offer rigorous guarantees for all aspects of network performance. Oversubscription typically means that the service provider has promised somewhat more bandwidth than he has the technical capacity to deliver. Since most users typically do not continuously utilize all of their promised or guaranteed bandwidth, the unused portion of the guaranteed may be temporarily assigned to other users.

Downstream Performance

The flexibility of the Transceiver Node 120 provides extensive flexibility in controlling downstream performance, and there are many different ways to provision downstream links. This section considers a typical configuration for environments in which service level agreements are more common—Internet access for businesses. To focus on the key parameters, this discussion makes several simplifying (but not unrealistic) assumptions.

Internet data traffic is classified separately from other applications. Separate classifiers are used for specific applications such as voice or T1/E1 over IP.

Each subscriber's data traffic is classified and policed independently. This assumption requires that one classifier and one policer be dedicated to each of the 16 subscribers on a channel.

All constant bit rate (CBR) traffic (e.g., voice on IP, T1/E1) is policed by a sustained rate and burst size only; peak rates are not used for this traffic. (Policers for non-data traffic have their WRED parameters for out-of-profile traffic set to discard all out-of-profile packets; setting both the minimum and maximum thresholds to zero accomplishes this action.)

Data traffic that is not time critical (web surfing, file downloading, etc.) is assigned to the lowest priority output buffer.

All 16 subscribers' data traffic policers have the same WRED parameters for in-profile traffic, and differ for out-of-profile traffic only in the maximum discard probability.

Recommended values for the WRED parameters include the following (see FIGS. 9 and 10 for definitions):
In-profile minimum threshold, $Th_{min}$, of 50000 bytes
In-profile maximum threshold, $Th_{max}$, of 150000 bytes
In-profile maximum drop probability $P_{max}$ of 26 (corresponding to a probability of 25/256)
Out-of-profile minimum threshold, $Th_{min|out}$, of 10000 bytes.
Out-of-profile maximum threshold, $Th_{max|out}$, of 30000 bytes With these assumptions, the following parameters can characterize downstream performance.

| Downstream Channel Characteristics | |
|---|---|
| $C_D$ | Downstream link capacity; the physical link capacity less sustained rates for all constant bit rate traffic |
| $H_D$ | Sum of the burst sizes for all non-data policers |

| Downstream Configuration parameters (per Subscriber) | |
|---|---|
| $B_D$ | Downstream Burst Size (bit) |
| $P_D$ | Downstream Peak Rate (bit/s) |
| $R_D$ | Downstream Sustained Rate (bit/s) |
| $W_D$ | Downstream Maximum Discard Probability (unit-less) |

Both strict SLAs and lenient SLAs are possible. Strict SLAs require configuration that satisfies the following constraint.

The sum of the peak rates for all subscribers must be less than the link capacity. [$\Sigma P_D < C_D$]

With that constraint, SLA parameters are easy to derive from configuration values.

| SLA Metric | TN Configuration Parameters |
|---|---|
| Peak Transmission Rate | equal to Downstream Peak Rate [$=P_D$] |
| Sustained Transmission Rate | equal to Downstream Sustained Rate [$=R_D$] |
| Transmission Burst Size | equal to Downstream Burst Size [$=B_D$] |
| TN Downstream Latency | no more than the time spent waiting for non-data traffic plus the time to transmit the out-of-profile maximum threshold worth of data [$=H_D/C + Th_{max|out}/C_D$] |
| TN Downstream Loss Rate | 0 |

Lenient SLAs require a less strict configuration constraint, namely the following.

The sum of the sustained rates for all subscribers must be less than the link capacity. [$\Sigma R_D < C_D$]

In the lenient case, closed form equations for SLA parameters are not possible. The following rules provide approximate bounds for those parameters.

| SLA Metric | TN Configuration Parameters |
|---|---|
| Peak Transmission Rate | either the Downstream Peak Rate or at least the weighted share of excess link capacity (capacity above the Downstream Sustained Rates of all TNs, whichever is smaller [$\geq \min(P_D, R_D + (C_D - \Sigma R_D) * B_D * W_D / \Sigma(B_D * W_D))$] |
| Sustained Transmission Rate | equal to Downstream Sustained Rate [$=R_D$] |
| Transmission Burst Size | equal to Downstream Burst Size [$=B_D$] |
| TN Downstream Latency | no more than the time spent waiting for non-data traffic plus the time to transmit the out-of-profile maximum threshold worth of data [$=H_D/C + Th_{max|out}/C_D$] |
| TN Downstream Loss Rate | 0 |

It should be understood that the foregoing relates only to illustrate the embodiments of the present invention, and that numerous changes may be made therein without departing from the scope and spirit of the invention as defined by the following claims.

What is claimed is:

1. An optical network system comprising:
   a laser transceiver node for receiving downstream packets;
   a subscriber optical interface coupled to the laser transceiver node for receiving downstream optical packets and converting the downstream optical packets into an electrical domain to support services of a subscriber;
   wherein, the laser transceiver node further comprises:
      a routing device for directing downstream packets in an electrical domain to a plurality of multiplexers, the routing device apportioning bandwidth in the electrical domain between subscribers and using a look-up table for processing the downstream packets and upstream packets;
      the plurality of multiplexers for receiving downstream packets from the routing device, wherein each multiplexer comprises a final stage for controlling bandwidth of the downstream packets in the electrical domain relative to the subscriber optical interface, the routing device determining which downstream packets are sent to a respective multiplexer, each multiplexer comprising:
      a plurality of classifiers for determining type of information contained in a downstream packet and for assigning a downstream packet to a particular policer, and
      a plurality of policers for controlling bandwidth based upon a comparison between parameters assigned to each policer by a network provider and a downstream packet; and
   laser transmitters coupled to the multiplexers, wherein each multiplexer is coupled to and directly modulates a respective laser transmitter for converting the downstream packets into an optical domain that are sent to a respective subscriber optical interface.

2. The optical network system of claim 1, wherein the parameters assigned to each policer comprise at least one of a peak rate, a burst size, and a sustained rate.

3. The optical network system of claim 1, wherein each policer controls bandwidth by assigning a weighted early random discard value to the packet.

4. The optical network system of claim 1, wherein each multiplexer further comprises a plurality of output buffers for storing at least one downstream packet received from a respective policer.

5. The optical network system of claim 1, further comprising a plurality of output buffers, each output buffer having an assigned priority value that is associated with an output buffer emptying sequence.

6. The optical network system of claim 5, wherein each output buffer evaluates a packet with a random early discard function that employs the weighted early random discard value.

7. The optical network system of claim 6, wherein the weighted early random discard value comprises a maximum drop probability value.

8. The optical network system of claim 1, further comprising a plurality of output buffers, each output buffer executes a random early discard function for a packet when an output buffer average volume is between a minimum and maximum threshold, the random early discard function employing the maximum drop probability value.

9. The optical network system of claim 1, wherein parameters assigned to a policer corresponds with a bandwidth subscription of a subscriber.

10. The optical network system of claim 9, wherein the bandwidth subscription measures a predetermined amount of a data to be received by a subscriber in bits per second.

11. The optical network system of claim 1, wherein one of the classifiers evaluates a differentiated service code point (DSCP) value of each downstream packet.

12. The optical network system of claim 1, wherein each classifier and each policer comprises one of a field programmable gate array (FPGA) and an application specific integrated circuit (ASIC).

13. A method for processing downstream packets of an optical network, comprising the steps of:
  receiving downstream packets with a laser transceiver node comprising an exit portion of an optical network;
  at the exit portion of the optical network:
    apportioning bandwidth in an electrical domain between subscribers with a routing device;
    using a look-up table in the routing device for processing a downstream packet to determine its downstream destination;
    classifying a downstream packet by evaluating a header of the packet;
    determining if the downstream packet matches at least one of rate and size parameters;
    assigning one of two priority values to the downstream packet based upon the determination if the downstream packet matches one of rate and size parameters;
    determining whether to store the downstream packet in one of a plurality of buffers based upon a weighted random early discard function that employs one of the priority values;
    receiving the downstream packet directly from an output buffer with a laser transmitter;
    modulating the laser transmitter with the downstream packet;
  receiving the downstream optical packet with a subscriber optical interface coupled to the laser transceiver node; and
  converting the downstream optical packet into an electrical domain with the subscriber optical interface to support services of a subscriber.

14. The method of claim 13, wherein the step of determining if the downstream packet matches at least one of rate and size parameters further comprises the steps of:
  determining whether a downstream packet exceeds a sustained rate; and
  determining whether a downstream packet exceeds a burst size.

15. The method of claim 14, wherein the step of determining whether the downstream packet exceeds a sustained rate further comprises the step of executing a token bucket algorithm to measure the sustained rate.

16. The method of claim 13, further comprising the steps of:
  determining if a Dounstream packet exceeds a peak rate; and
  discarding a downstream packet if the downstream packet exceeds the peak rate.

17. The method of claim 16, wherein the step of determining whether the downstream packet exceeds a peak rate further comprises the step of executing a token bucket algorithm to measure the peak rate.

18. The method of claim 13, wherein the step of assigning one of two priority values to a downstream packet comprises the step of assigning a maximum drop probability value to the downstream packet.

19. The method of claim 18, wherein the step of assigning a maximum drop probability value further comprises the step of assigning the maximum drop probability value based upon a determination of whether a packet matches sustained rate.

20. The method of claim 19, wherein the communication traffic profile comprises one of a minimum bandwidth that a class or group of classes of subscribers is assured of receiving and a maximum bandwidth the subscriber can use over a time period.

21. The method of claim 13, further comprising the step of removing one or more packets from a plurality of output buffers in a predetermined order that corresponds with priority assignment given to each buffer relative to other buffers.

22. The method of claim 13, further comprising the step of executing the random early discard function that assesses parameters of the downstream packet when an output buffer average volume is between a minimum and maximum threshold, the random early discard function defining a drop probability value for the downstream packet.

23. The method of claim 13, wherein the step of classifying further comprises the step of evaluating a differentiated service code point (DSCP) value of the packet.

24. The method of claim 13, further comprising the steps of:
  classifying the downstream packet with a classifier; and
  mapping a downstream packet to policer that is associated with the classifier.

25. A network policer system comprising:
  an optical network comprising:
  a data service hub for generating downstream data packets;
  a transceiver node coupled to the data service hub and comprising an exit path relative to the data service hub for receiving and processing the downstream data packets, the transceiver node further comprising:
    a routing device for directing the downstream data packets in an electrical domain to a plurality of multiplexers, the routing device apportioning bandwidth in the electrical domain between subscribers and using a look-up table for processing the downstream packets and upstream packets;
    the plurality of multiplexers for receiving downstream packets from the routing device, wherein each multiplexer comprises a final stage for controlling bandwidth of the downstream packets in an electrical domain relative to a subscriber optical interface, the routing device determining which downstream packets are sent to a respective multiplexer, each multiplexer comprising:

a plurality of classifiers for determining type of information contained in a downstream packet, and a plurality of policers for controlling bandwidth by one of discarding packets and assigning one of two priority values to a downstream packet;

a plurality of buffers for receiving downstream packets from the policers;

a laser transmitter coupled directly to the buffers for propagating the downstream packets over an optical waveguide;

an optical tap coupled to the optical waveguide; and the subscriber optical interface coupled to the optical tap for converting the downstream packets from an optical domain into an electrical domain that support services of a subscriber.

26. The network policer system of claim 25, wherein the plurality of buffers correspond to the priority assignment and execute a weighted random early discard function.

27. The network policer system of claim 25, wherein the transceiver node Further comprises a routing device for passing downstream packets to the classifiers.

28. The network policer system of claim 25, wherein the priority values comprise weighted early random discard values.

29. The network policer system of claim 28, wherein weighted early random discard values comprise maximum drop probability values.

30. A method for policing downstream data packets exiting an optical network, comprising the steps of forming exit pathways of the optical network within a laser transceiver node;

apportioning bandwidth in an electrical domain between subscribers with a routing device that is part of the laser transceiver node;

using a look-up table with the routing device for processing downstream packets to determine downstream destinations;

positioning a plurality of classifiers and policers at directly adjacent to the exit pathways of the optical network, each exit pathway comprising a laser transmitter and an optical waveguide;

discarding downstream packets in an electrical domain with the policers if they exceed a peak rate;

assigning one of at least two priority values to each downstream packet with the policers;

controlling downstream data packet egress from The network in an electrical domain at a position directly adjacent to the exit pathways by evaluating the priority values with the policers;

receiving downstream data packets from the policers with a laser transmitter;

converting the downstream data packets into an optical domain with the laser transmitter;

propagating the downstream optical data packets over an optical waveguide;

receiving the downstream optical data packets with a subscriber optical interface; and converting the downstream optical data packets into an electrical domain with the subscriber optical interface for supporting services of a subscriber.

31. The method of claim 30, wherein the step of assigning one of at least two priority values further comprises the steps of:

determining if a downstream packet matches a sustained rate; and determining if a downstream packet matches a burst size.

32. The method of claim 30, wherein the step of controlling downstream data packet egress from the network comprises the step of determining whether to admit a downstream packet to one of a plurality of buffers based upon a weighted random early discard function that employs one of the priority values.

33. The method of claim 30, wherein the step of assigning one of at least two priority values comprises the step of assigning a maximum drop probability value to each downstream packet.

* * * * *

UNITED STATES PATENT AND TRADEMARK OFFICE
CERTIFICATE OF CORRECTION

PATENT NO. : 7,197,244 B2
APPLICATION NO. : 10/045652
DATED : March 27, 2007
INVENTOR(S) : Stephen A. Thomas et al.

It is certified that error appears in the above-identified patent and that said Letters Patent is hereby corrected as shown below:

Claim 16, column 34, line 5 "determining if a Dounstream packet exceeds a peak rate" should be changed to -- determining if a downstream packet exceeds a peak rate --.

Claim 30, column 36, line 7, "controlling downstream data packet egress from The" should be changed to -- controlling downstream data packet egress from the --.

Signed and Sealed this

Tenth Day of July, 2007

JON W. DUDAS
*Director of the United States Patent and Trademark Office*